(12) United States Patent
Barrett et al.

(10) Patent No.: US 12,007,959 B2
(45) Date of Patent: Jun. 11, 2024

(54) APPARATUSES, METHODS, AND COMPUTER-PROGRAM PRODUCTS FOR GENERATING AND UPDATING OBJECT TYPES ACROSS MULTIPLE SCHEMAS

(71) Applicants: ATLASSIAN PTY LTD., Sydney (AU); ATLASSIAN US, INC., San Francisco, CA (US)

(72) Inventors: Jeremey Llewellyn Barrett, Balmain East (AU); Ola Melin, Pyrmont (AU); Michael Johannes Ruflin, Elizabeth Bay (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/657,491

(22) Filed: Mar. 31, 2022

(65) Prior Publication Data
US 2023/0315698 A1 Oct. 5, 2023

(51) Int. Cl.
*G06F 16/21* (2019.01)
*G06F 16/22* (2019.01)

(52) U.S. Cl.
CPC ........ *G06F 16/211* (2019.01); *G06F 16/2264* (2019.01)

(58) Field of Classification Search
CPC ............................ G06F 16/211; G06F 16/2264
See application file for complete search history.

(56) References Cited

U.S. PATENT DOCUMENTS 10,025,568 B2 * 7/2018 Mayer ...................... G06F 8/71

* cited by examiner

*Primary Examiner* — Baoquoc N To
(74) *Attorney, Agent, or Firm* — ALSTON & BIRD LLP

(57) ABSTRACT

Various embodiments of the present disclosure provide for generating, updating, and/or otherwise managing an assent management system and its associated objects. An example embodiment is configured for accessing an asset management repository comprising a plurality of object type identifier nodes and a plurality of object attribute identifier nodes configured in a directed graph structure; receiving an object query comprising a selected object type identifier; traversing the directed graph structure to return a selected object type schema comprising an object attribute identifier node subset associated with the selected object type identifier; and outputting a selected object type interface component based on the selected object type schema for rendering to the object types registry interface.

24 Claims, 14 Drawing Sheets

APPARATUSES, METHODS, AND COMPUTER-PROGRAM PRODUCTS FOR GENERATING AND UPDATING OBJECT TYPES ACROSS MULTIPLE SCHEMAS

BACKGROUND

Conventional systems for managing data objects of enterprise systems suffer many deficiencies and problems. For instance, conventional systems tend to manage and track data objects having narrowly defined attributes that are not easily changed or updated even as requirements for the enterprise or the enterprise system change with time. Through applied effort, ingenuity, and innovation, these identified deficiencies and problems have been solved by developing solutions that are configured in accordance with the embodiments of the present disclosure, many examples of which are described in detail herein.

BRIEF SUMMARY

In general, embodiments of the present disclosure provided herein include improved apparatuses, methods, systems, and computer program products configured for managing objects, object type identifiers, and/or object attribute identifiers associated with an asset management system. In accordance with one exemplary embodiment of the present disclosure, an apparatus is configured to manage an object types registry interface of an asset management system, the apparatus comprising at least one processor and at least one memory, the at least one memory having computer-coded instructions therein, wherein the computer-coded instructions are configured to, in execution with the at least one processor, cause the apparatus to: access an asset management repository comprising a plurality of object type identifier nodes and a plurality of object attribute identifier nodes configured in a directed graph structure; receive an object query comprising a selected object type identifier; traverse the directed graph structure to return a selected object type schema comprising an object attribute identifier node subset associated with the selected object type identifier; and output a selected object type interface component based on the selected object type schema for rendering to an object types registry interface.

In some embodiments, the computer-coded instructions of the apparatus are further configured to cause the apparatus to receive a second attribute creation request, the second attribute creation request comprising a second plurality of object attribute identifier nodes in association with the plurality of object type identifier nodes to be configured in the directed graph structure. In some embodiments, the second plurality of object attribute identifier nodes comprises at least a second object attribute identifier node configured to generate a second object type schema with an object type identifier node of the plurality of object type identifier nodes. In some embodiments, the computer-coded instructions are further configured to cause the apparatus to generate an association between an object type schema and the second object type schema, wherein the object type schema is associated with the selected object type schema. In some embodiments, the association between the object type schema and the second object type schema comprises an updated object version identifier associated with the object type identifier node of the second object type schema.

In some embodiments, the plurality of object attribute identifier nodes configured in a directed graph structure comprise a plurality of object version identifiers nodes associated with a plurality of version types for the object type of the object type identifier node. In some embodiments, the computer-coded instructions are further configured to cause the apparatus to generate an object version type schema comprising at least the object type identifier node and the plurality of object version identifier nodes based on a plurality of shared object attribute identifier nodes, wherein each object version identifier node of the plurality of object version identifier nodes comprises at least one of a plurality of incident identifiers or a plurality of change identifiers. In some embodiments, the computer-coded instructions are further configured to cause the apparatus to: receive an object version query comprising the selected object type identifier; traverse the directed graph structure to return the object version type schema comprising at least an object version identifier node subset associated with the selected object type identifier; and output a selected object version type interface component based on the object version identifier node subset for rendering to the object types registry interface.

In accordance with one exemplary embodiment of the present disclosure, a computer-implemented method for managing an object types registry interface of an asset management system, the computer-implemented method comprising; accessing an asset management repository comprising a plurality of object type identifier nodes and a plurality of object attribute identifier nodes configured in a directed graph structure; receiving an object query comprising a selected object type identifier; traversing the directed graph structure to return a selected object type schema comprising an object attribute identifier node subset associated with the selected object type identifier; and outputting a selected object type interface component based on the selected object type schema for rendering to an object types registry interface.

In some embodiments, the computer-implemented method may further comprise receiving a second attribute creation request, the second attribute creation request comprising a second plurality of attribute identifier nodes in association with the plurality of object type identifier nodes to be configured in the directed graph structure. In some embodiments, the second plurality of attribute identifier nodes comprises at least a second attribute identifier node configured to generate a second object type schema with an object type identifier node of the plurality of object type identifier nodes. In some embodiments, the computer-implemented method may further comprise generating an association between an object type schema and the second object type schema, wherein the object type schema is associated with the selected object type schema. In some embodiments, the association between the object type schema and the second object type schema comprises an updated object version identifier associated with the object type identifier node of the second object type schema.

In some embodiments, the plurality of object attribute identifier nodes configured in a directed graph structure comprise a plurality of object version identifiers nodes associated with a plurality of version types for the object type of the object type identifier node. In some embodiments, the computer-implemented method may further comprise generating an object version type schema comprising at least the object type identifier node and the plurality of object version identifier nodes based on a plurality of shared object attribute identifier nodes, wherein each object version identifier node of the plurality of object version identifier nodes comprises at least one of a plurality of incident identifiers or a plurality of change identifiers. In some embodiments, the computer-implemented method may further comprise: receiving an object version query comprising the selected object type identifier; traversing the directed graph structure to return the object version type schema comprising at least an object version identifier node subset associated with the selected object type identifier; and outputting a selected object version type interface component based on the object version identifier node subset for rendering to the object types registry interface.

In some embodiments, a computer-program product comprising at least one non-transitory computer-readable storage medium having computer-readable program code thereon that, in execution with at least one process, configures the computer-program product for: accessing an asset management repository comprising a plurality of object type identifier nodes and a plurality of object attribute identifier nodes configured in a directed graph structure; receiving an object query comprising a selected object type identifier; traversing the directed graph structure to return a selected object type schema comprising an object attribute identifier node subset associated with the selected object type identifier; and outputting a selected object type interface component based on the selected object type schema for rendering to an object types registry interface. In some embodiments, the computer-readable program code is further configured for: receiving a second attribute creation request, the second attribute creation request comprising a second plurality of attribute identifier nodes in association with the plurality of object type identifier nodes to be configured in the directed graph structure. In some embodiments, the second plurality of attribute identifier nodes comprises at least a second attribute identifier node configured to generate a second object type schema with an object type identifier node of the object type identifier nodes. In some embodiments, the computer-readable program code is further configured for generating an association between an object type schema and the second object type schema, wherein the object type schema is associated with the selected object type schema. In some embodiments, the association between the object type schema and the second object type schema comprises an updated object version identifier associated with the object type identifier node of the second object type schema.

In some embodiments, the plurality of object attribute identifier nodes configured in a directed graph structure comprise a plurality of object version identifiers nodes associated with a plurality of version types for the object type of the object type identifier node. In some embodiments, the computer-readable program code is further configured for generating an object version type schema comprising at least the object type identifier node and the plurality of object version identifier nodes based on a plurality of shared object attribute identifier nodes, wherein each object version identifier node of the plurality of object version identifier nodes comprises at least one of a plurality of incident identifiers or a plurality of change identifiers. In some embodiments, the computer-readable program code is further configured for: receiving an object version query comprising the selected object type identifier; traversing the directed graph structure to return the object version type schema comprising at least an object version identifier node subset associated with the selected object type identifier; and outputting a selected object version type interface component based on the object version identifier node subset for rendering to the object types registry interface.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 11:
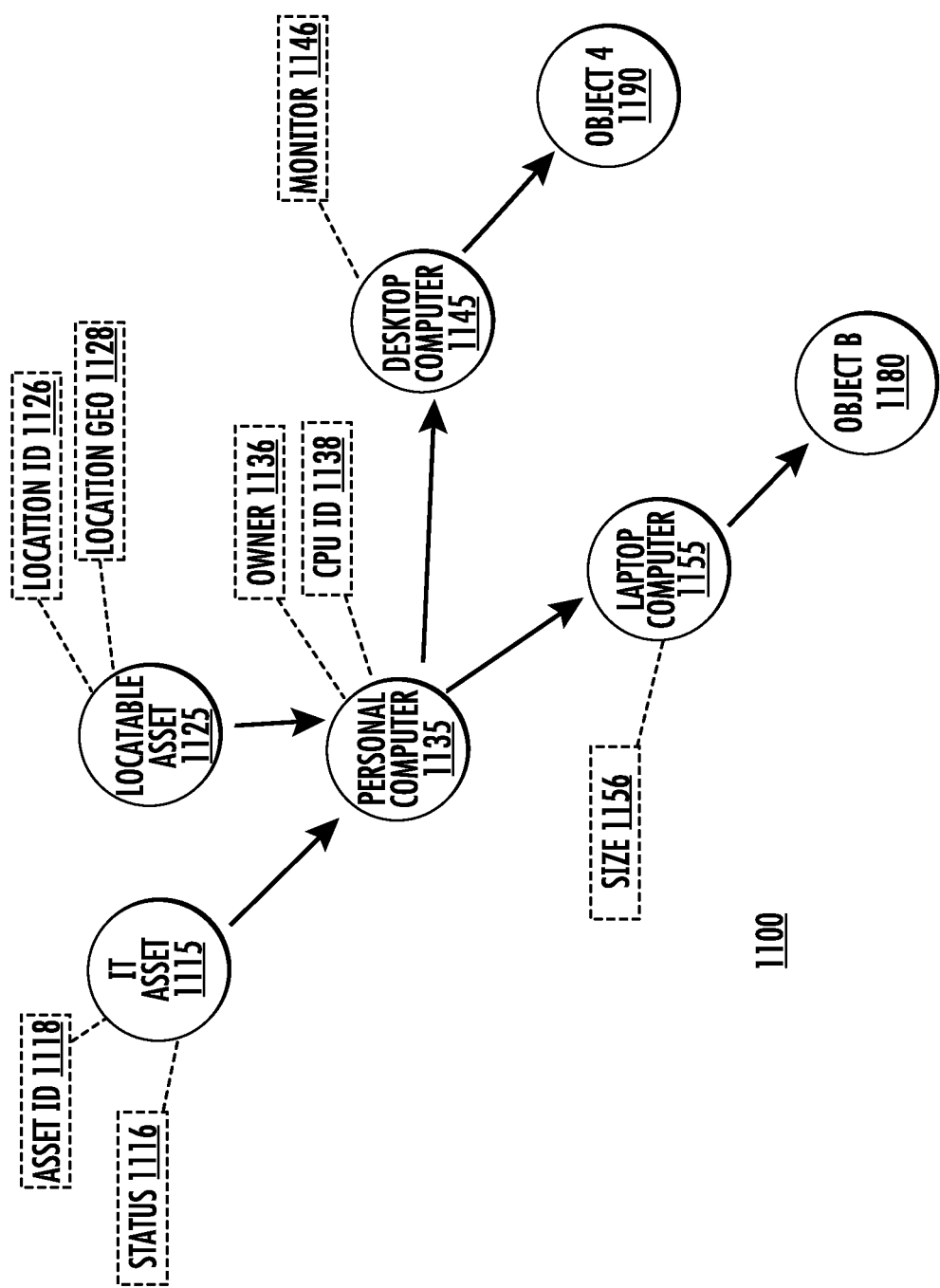

FIG. 11 is a graph diagram of an example schema generated for a plurality of objects based on a mapping of object type identifiers and object attribute identifiers, including object type identifiers and object attribute identifiers directed to computing features, wherein the schema is associated with an example asset management system in accordance with one or more embodiments of the present disclosure.

Figure 12:
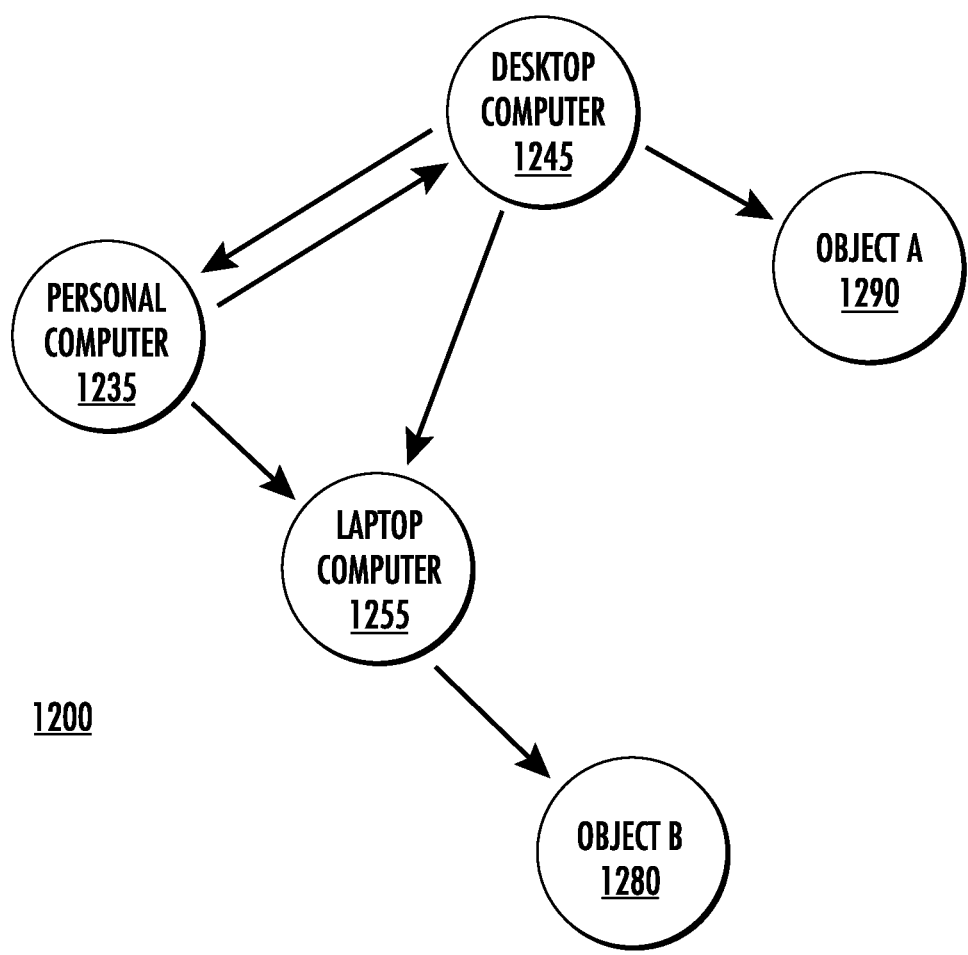

FIG. 12 is a graph diagram of an example schema generated for a specific object type query and the associated identifiers that may be traversed within a directed graph structure of schema(s), wherein the schema is associated with an example asset management system in accordance with one or more embodiments of the present disclosure.

Figure 13:
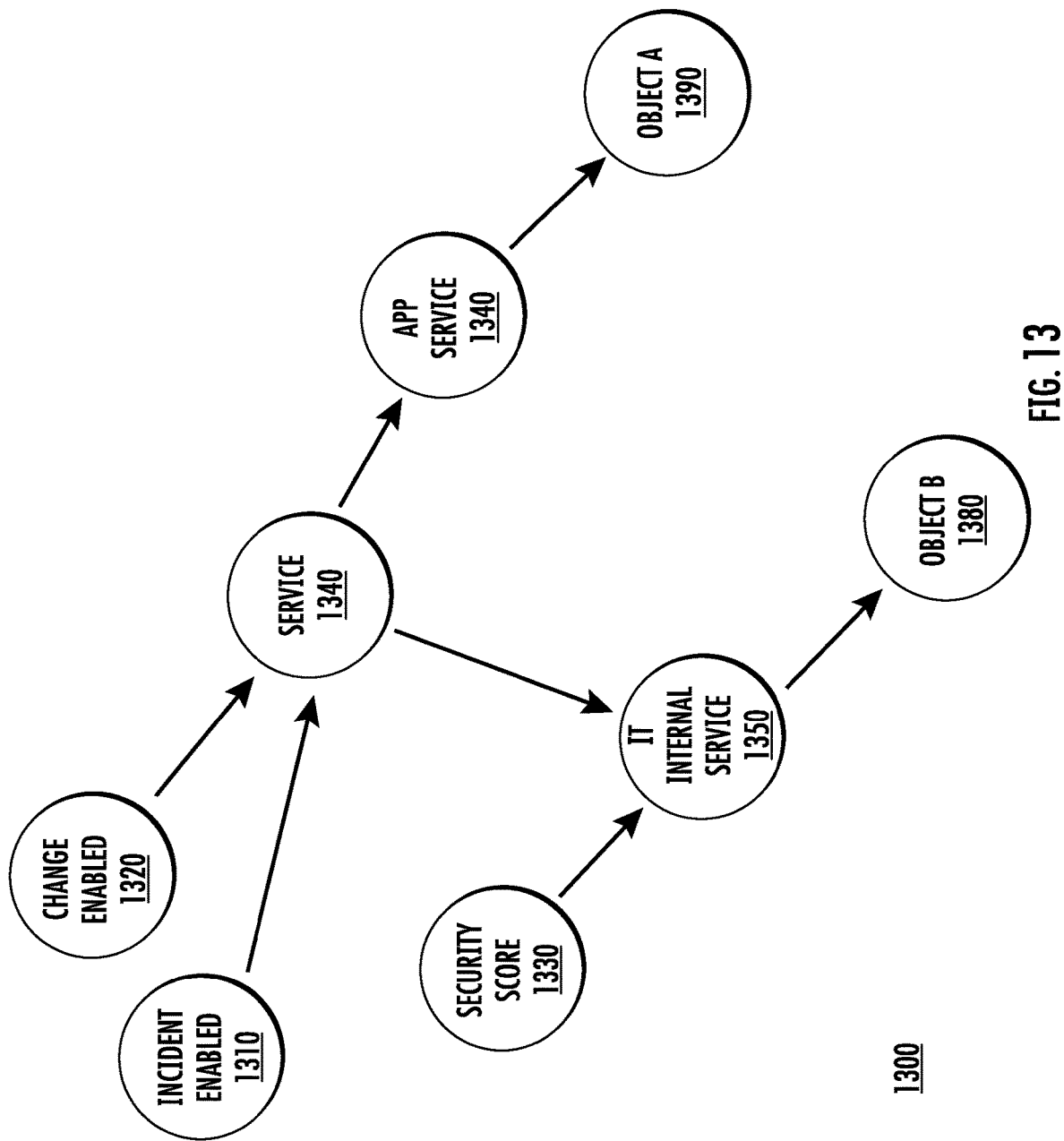

FIG. 13 is a graph diagram of an example selected object type schema generated for rendering on an example selected object type interface component which may be displayed by an object types registry interface in accordance with one or more embodiments of the present disclosure.

Figure 14:
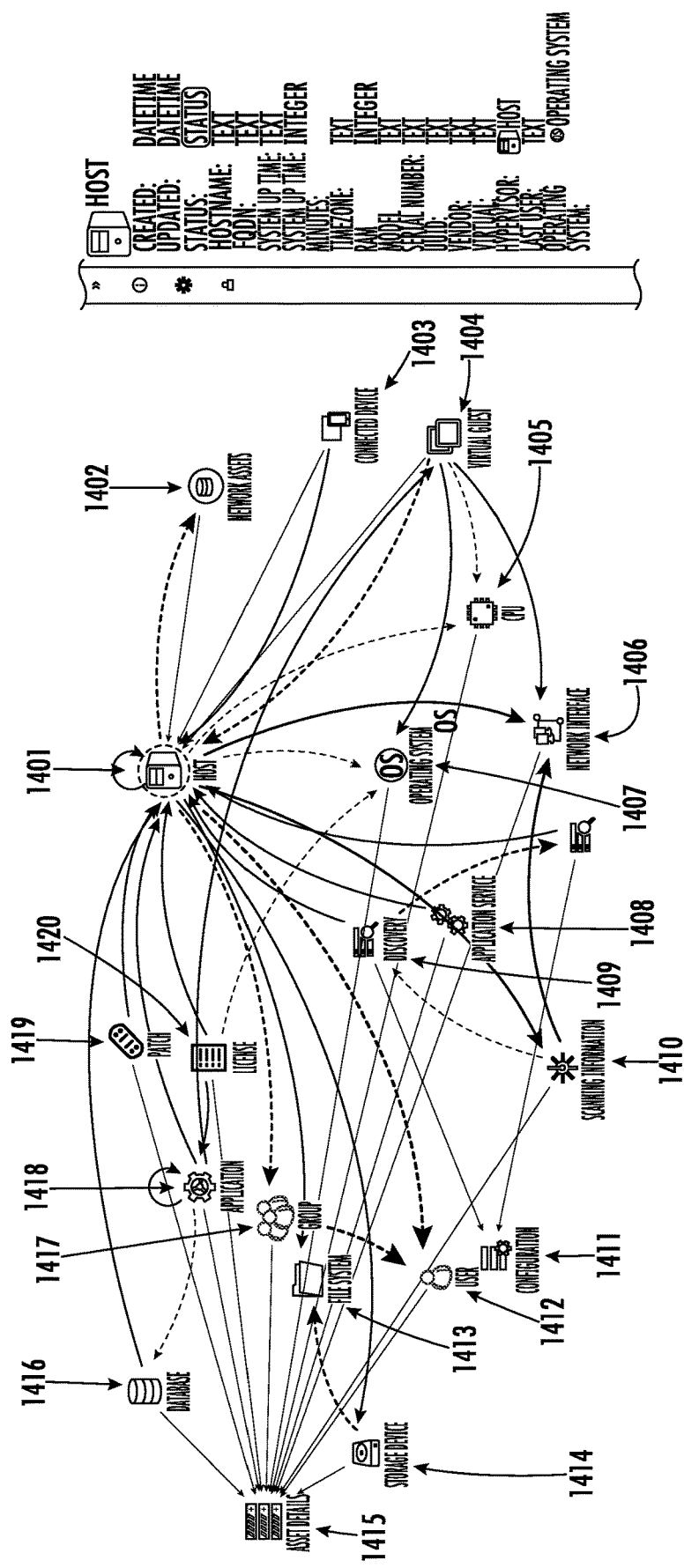

FIG. 14 provides an exemplary selected object type interface component rendered on an example object types registry interface in accordance with one or more embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present disclosure address technical problems associated with efficiently tracking and reliably managing disparate objects within an asset management system. Each object is associated with various attributes and may be mapped or otherwise associated with other objects. Such object attributes and object relationships may be collectively referred to as object schemas.

It is important that users of an asset management system have visibility to object schemas corresponding to any object managed by the asset management system. Thus, schemas must be defined for each object that is added to the asset management system for management and tracking. For ease of onboarding, template schemas may be developed for objects based on object class or object type.

Asset management systems are configured to track and manage objects for an enterprise having systems and requirements that change with time. Thus, object schemas that were appropriate and effective for managing an object type in year one might be inadequate in year two. It is important then that the asset management system be configured to create new object schemas for any object type. However, it also important that any newly created object type schema be backward compatible such that legacy object schemas associated with a particular object type are not lost when new object schemas for the particular object type are brought online.

Let us consider the example of an example asset management system deployed by Acme Corporation ("Acme") to manage various objects including personal computers, servers, monitors, printers, and desks. In year one of deployment of the asset management system, all of Acme's personal computers were desktop computers. Thus, a schema was developed for personal computers having the following attributes: unique identifier, operating system identifier, power cable identifier, assigned employee identifier, and deployed office location identifier. The personal computer schema also included mapping to related objects including a connected monitor. Twenty-seven personal computers were added to the asset management system for tracking in year one.

Acme purchased in year two a dozen new personal computers; however, these were laptop computers. A new personal computer schema was developed because the new laptops had different attributes and object mappings than the predecessor desktop computers. The new personal computer schema included the following attributes: unique identifier, operating system identifier, power cable identifier, and assigned employee identifier. The new personal computer schema also included mapping to related objects including: a connected docketing station identifier, a lithium ion battery identifier, and a connected monitor.

It is important that the asset management system be configured collectively track and manage all of Acme's personal computers even though the personal computer schemas have changed. It is important that the personal computers associated with the first schema (e.g., desktop computers) are transferred or mapped to the second personal computer schema based on one or more identified object attribute identifiers and/or identified object type identifiers. Such transfer and/or copying of data of an object between schemas allow for less potential loss of data within the objects and their associated data and more accurate transfer of data between versions of objects within one or more schemas, wherein one object may be mapped to a plurality of schemas without loss of particular data between each mapping.

The disclosed techniques can be utilized by an asset management system to provide updated schema data on particular data objects; updated data object identifiers based on each associated schema; track one or more object attribute identifiers of each object including such attributes comprising service identifiers of each object, location identifiers of each object, change identifiers, incident identifiers of each object, associated service members of each object, and/or the like; without the loss of data for each object between schema transmission or schema design for dedicated new versions of historical objects.

The volume of participating objects within an asset management system may cause inefficient time periods to be used tracking and manual reentering data, type identifiers, and attribute identifiers, and/or the like for each object as they are transferred between one or more schemas. It is undesirable for an asset management system to require manual entry or mapping of objects created under a first schema to a second schema given the volume of objects managed by modern enterprise asset management systems. Manual entry also introduces undesirable higher likelihoods of error when updating and mapping object schemas.

Various embodiments of the present invention are directed to an improved asset management system that is configured to programmatically access a memory or repository comprising a group of object type identifier nodes (e.g., identifier nodes associated with personal computers) and a group of object attribute identifier nodes (e.g., operating system identifier, power cable identifier, assigned employee identifier, deployed office location identifier, and/or the like) configured in a directed graph structure (e.g., a structure of data comprising relationships between the objects of the asset management system, wherein at least one object—like a personal computer—may be mapped to a plurality of other objects—other personal computers—based on shared object attribute identifier nodes).

The asset management system may further be configured to receive an object query (e.g., a request by a user of the asset management system to access a particular object's schema(s)) comprising a selected object type identifier (e.g., an identifier of the particular object, such as an identifier of a particular personal computer, such as a particular laptop computer or a desktop computer). The asset management system may further be configured to navigate or traverse the directed graph structure to return a selected object type schema associated with the selected object type identifier (e.g., a schema comprising data associated with the selected object type identifier like a particular laptop computer), and wherein the selected object type schema further comprises an object attribute identifier node subset connected to the selected object type identifier (e.g., a subset of the object attribute identifier nodes within the directed graph structure, where the subset of object attribute identifier nodes are only associated with the particular object and its selected object type identifier node, such as those attribute identifier nodes associated with the laptop computer, like a size of the particular laptop computer, the CPU ID of the particular laptop computer, a unique identifier, an operating system identifier, a power cable identifier, and/or an assigned employee identifier for the laptop computer).

The asset management system may further be configured to output a selected object type interface component based on the selected object type schema, such as the selected object type schema of a particular laptop computer. For instance, the selected object type interface component may be rendered to an object types registry interface (e.g., an interface of the asset management system to be rendered to one or more users, including the requesting user(s) that may have input the object query) via a display of a client device, where the object type interface component may comprise the object type identifiers and/object attribute identifiers associated with the selected object type schema.

Such an asset management system, like the one described herein, may improve over other asset management systems by automatically tracking, managing, and updating objects to a plurality of object schemas. The asset management system described herein improves the updating of objects to a plurality of schemas without suffering the loss of data in the transfer and without suffering inefficiency in transferring and/or duplicating data of an object between multiple object type schemas. Indeed, the inventors have improved over prior asset management systems by improving the tracking and transferring of objects between a multitude of schemas; and improving the automatic generation of new schemas comprising previously generated objects and/or object type identifiers accurately and efficiently, by automatically mapping the previously generated objects and/or object type identifiers to new object type schemas.

Lastly, and importantly, the present invention improves computer storage and functionality over the prior art by allowing objects and their associated data to be tracked to a multitude of schemas within a directed graph structure—wherein the directed graph structure may comprise all the schemas associated with one object—which may allow a single directed graph structure to be parsed for each object instead of the asset management system having to parse out multiple directed graph structures and/or storage environments for each iteration/version of the objects and their associated schemas. Thus, such a directed graph structure and automatic generation of new schemas based on previously-generated objects and object type identifiers/object type identifier nodes may improve computer processing speed by allowing the object types registry server and/or another processor to quickly traverse a single directed graph structure for multiple objects, multiple attributes, and multiple versions of the objects.

To address the above-described challenges related to managing data objects associated with multiple schemas and, in some instances, multiple systems, various embodiments of the present disclosure are directed to systems, apparatuses, methods and/or computer program products for asset management based on identified objects comprising object types and object attributes as both change and evolve over time without loss due to such change and evolution. The asset management system may be, for example, a system that manages objects/assets (e.g., system components, system micro-components, services, microservices, etc.) of a system, which may all be located locally to each other across wide distances in different facilities but interconnected over a network.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "object" refers to a digital content object that is a digital representation of an asset or resource that is tracked and managed by an asset management system. Objects define discrete categories or object types (defined below), such as a physical asset (e.g., computer such as a personal computer/desktop computer, office furniture, vehicle, real estate, etc.), a digital asset (e.g., software), a set of data, a person (e.g., new employee), or any other tangible or intangible asset (e.g., intellectual property) that may be registered, known, or accessed by the asset management system. For example, an object may be a laptop or other IT-related item wherein object data, such as attributes, ticket information, comments, and the like, are uploaded or otherwise stored in a data repository (e.g., an object data repository) accessible by the asset management system. In various embodiments, an object may refer to employees or users that are identifiable. By way of non-limiting example, an example Object may be shown as Objects 103A-103N of FIG. 1.

The term "object type" refers to a group, category, and/or classification of two or more objects defined by the asset management system to include a common object type identifier and a common object type schema. Exemplary object types include, but are not limited to, file system, network (e.g., LAN, WAN, VPN), hardware (e.g., host device, client device, computer, desktop, laptop, server, mobile device, printer, modem), software (e.g., application, operating system), accessory, cloud, employee, location, intellectual property (e.g., copyright, license), etc.

The term "plurality of object type identifier nodes" refers to one or more items of data which may indicate insights, vectors, relationships, and/or the like between a plurality of object type identifiers within a directed graph structure and/or an object type schema. By way of non-limiting example, the plurality of object type identifier nodes may comprise pointers, memory addresses, vectors, which may be indicate a mapping between at least one object (e.g., a first object) and a different object (e.g., a second object) in a directed graph structure and/or object type schema based on an object type identifier shared by the first object and the second object. Such a plurality of object type identifier nodes may be stored in a data repository (e.g., an object data repository) accessible by the asset management system.

The term "plurality of object attribute identifier nodes" refers to one or more items of data which may indicate insights, vectors, relationships, and/or the like between a plurality of object attribute identifiers within a directed graph structure and/or an object type schema. By way of non-limiting example, the plurality of object attribute identifier nodes may comprise pointers, memory addresses, vectors, which may be indicate a mapping between at least one object (e.g., a first object) and a different object (e.g., a second object) in a directed graph structure and/or object type schema based on an object attribute identifier shared by the first object and the second object. Such a plurality of object attribute identifier nodes may be stored in a data repository (e.g., an asset management repository) accessible by the asset management system.

The term "object type schema" refers to a structure of object types that comprises one or more object type identifier node(s), object attribute identifier node(s), and one or more edges connecting the one or more objects comprising the one or more object type identifier nodes and object attribute identifier nodes. As another example, an object type schema may refer to a table structure of object that comprises one or more table elements which may be organized based on relationship of each object type identifier and object attribute identifier of at least one object to an object type identifier and object attribute identifier of at least a second object.

The term "selected object type identifier" refers to one or more items of data by which a selected object type of an asset management system may be uniquely identified (e.g., a user-identified by selecting or requesting an object via an object query in the asset management system). In some embodiments, the selected object type identifier may comprise user-input comprising an object type identifier of a user-specified object, wherein the asset management system may traverse a directed graph structure base on the user-specified object type identifier to return the selected object type schema comprising the object type of the object type identifier.

The term "object attribute identifier node subset" refers to a subset of one or more items of data which indicate a subset of a plurality of object attribute identifier nodes and a subset of a plurality of object type identifier nodes based on a selected object type identifier in the asset management system. By way of non-limiting example, the object attribute identifier subset may be used by the asset management system to indicate a plurality of objects associated with the subset of plurality of object attribute identifier nodes and the subset of plurality of object tryp identifier nodes based on the selected object type identifier via the object query, wherein the identifier attribute identifier node subset comprises only a specified portion of objects based on the object query and the associated object identifier nodes (e.g., object type identifier nodes and object attribute identifier nodes). In some embodiments, the object attribute identifier node subset may be stored in an asset management repository and/or a directed graph structure repository accessible by the asset management system.

The term "selected object type schema" refers to a structure of data object types by which an object type schema of an asset management system may be uniquely identified (e.g., user-identified by selecting or requesting an object query comprising a selected object type identifier of an object type comprised within the object type schema of the selected object type schema) and that comprises on or more object type identifier node(s), object attribute node(s), and one or more edges connecting the one or more objects comprising one or more object type identifier nodes and object attribute identifier nodes associated with the object query and selected object type identifier which comprises a subset of identifier nodes (e.g., a subset of the objects, associated object type identifier nodes, and object attribute identifier nodes associated with the selected object type identifier) from an object type schema. In some embodiments, the selected object type schema may be used to generate a selected object type schema interface component based on a received object query, wherein the selected object type schema comprises a selected object type identifier associated with the object query and wherein the selected object type schema is renderable via the selected object type schema component on a configured graphical user interface. In some embodiments, the selected object type schema may be stored in a memory such as the asset management repository.

The term "selected object type schema interface component" refers to data capable of being renderable on a graphical user interface to indicate the selected object type schema of the present disclosure which comprises the object type identifiers and/or object attribute identifiers associated with the object type identifier nodes and/or object attribute identifiers, respectively, of the selected object type schema. The selected object type schema interface component may be stored on a storage subsystem, such as the asset management system and its associated repositories (e.g., asset management repository 225).

The term "object types registry server" refers to a software platform and associated hardware that is configured to manage various object types registry interfaces of the asset management system. The object types registry server is accessible via one or more computing devices, is configured to receive object queries (e.g., "object query"), attribute creation requests (e.g., a "second attribute creation request" or any attribute creation request thereafter), object version queries (e.g., "object version query"); and access one or more data repositories such as an asset management repository and/or a directed graph structure repository. The functionality of the object types registry server may be provided via a single server or collection of servers having a common functionality, or the functionality of the object page configuration server may be segmented among a plurality of servers or collections of servers performing subsets of the described functionality of the object page configuration server.

The term "object types registry interface" refers to a user interface element that is rendered to a visual display and is configured (e.g., provides options) to enable a user to query an asset management repository to identify and access an object type schema (e.g., a selected object type schema), comprising a plurality of object types and/or generation of a plurality of object type schemas comprising one or more data objects, including the sharing of data objects across different object type schemas and/or the sharing of different version types of the object types to be visually represented in an object types registry interface in an asset management system. Exemplary object types registry interfaces may be rendered in any desired form including, but not limited to, as a mobile application for display on a mobile computing device (e.g., a smartphone, table computer, etc.), a webpage or website for display on a mobile or non-mobile computing device via the Internet, and the like. For example, the [Placeholder-UI of FIG. 9] is an example of an object types registry interface.

The term "directed graph structure" refers to a data structure configured to represent relationships between objects comprising one or more identifiers (e.g., object type identifier and/or object attribute identifier) with other objects comprising the same, similar, or different identifiers (e.g., object type identifiers and/or object attribute identifiers). For example, Object A (610) and Object B (660), of FIG. 6, may comprise the same or similar object type identifiers and/or different object type identifiers (e.g., Object Type A 616, Object Type A' 618, Object Type B 662, Object Type B' 667, and/or the like) such as an object type of a particular service shared between both Object A (610) and Object B (660) which may allow the directed graph structure to comprise both Object A and Object B in the same scheme or structure (e.g., schema shown as 600 of FIG. 6), and both Object A (610) and Object B (660) may comprise the same object attribute type (e.g., Attribute 1, 620 of FIG. 6). In contrast, and in some embodiments, the schema (e.g., schema 600) may also comprise objects with different object attribute identifiers within the same schema (e.g., both Object A' (615) and Object B' (665) may also comprise different attributes, such as Object A' (610) may be associated with Attribute 1' (630) and Object B' may be associated with Attribute 2' (650)).

In some embodiments, and as it should be understood by those in the relevant art, the schemas described herein (e.g., comprising a plurality of objects, a plurality of object type identifiers, and/or a plurality of object attribute identifiers) may be stored and configured in a variety of forms, such as SQL tables, document storage, relational databases, directed work graphs, and/or the like.

In some embodiments, the object type identifiers and attribute identifiers are represented by nodes of the directed graph structure, such as object type identifier nodes and object attribute identifier nodes. In some embodiments, the object type identifiers and object attribute identifiers are represented by edges of the directed graph structure. In some embodiments, a graphical representation of the directed graph structure can be, at least partially, rendered via a graphical user interface (e.g., object types registry interface). The directed graph structure can comprise one or more weighted graphs, multigraphs, isomorphic graphs, trees, tables, the like, or combinations thereof. In some embodiments, such directed graph structures may be stored in a directed graph structure repository, such as that shown in FIG. 1 as directed graph structure repository 230. In some embodiments, the directed graph structures described herein may be stored in an asset management repository, such as that shown in FIG. 1 as asset management repository 225. In some embodiments, the directed graph structure repository, 230 of FIG. 1, may be stored in the asset management repository 225 of FIG. 1 as a sub-repository in the asset management system 200.

The term "object attribute identifier" refers to one or more items of data by which an object attribute of an object within an asset management system may be uniquely identified. For example, an object attribute identifier may comprise ASCII text, a pointer, a memory address, and the like. Exemplary object attributes include but are not limited to source location (e.g., a specific server associated with an entity which is associated with the object), status (e.g., a service status on the object), status identifiers (e.g., a status of a particular service as "incomplete," "complete," "in progress" on the object), and other such items of data that may be associated with a source, status, or insight of an object.

The term "object type identifier" refers to one or more items of data by which an object type of an asset management system may be uniquely identified. For example, an object type identifier may comprise ASCII text, a pointer, a memory address, and the like, which may be used to identify object types comprising a group, category, and/or classification of two or more objects with similar kinds of information.

The term "object query" refers to a request received from a computing device to the asset management system comprising at least one of an object identifier, object type identifier, object attribute identifier, and/or other such identifiers associated with an object of the asset management system. In some embodiments, the object query may comprise a natural language identifier of an object in the asset management system used to identify said object, but may be transmitted as computer-readable language comprising ASCII text, a pointer, a memory address, and the like, which may be used to identify one or more objects. In some embodiments, the object query may comprise user-input ASCII text, user-input pointer, user-input memory address, and the like.

The term "directed graph structure repository" refers to a structured data set or repository for storing one or more previously generated directed graph structures comprising schemas of object data (e.g., object type schema(s) and/or object version type schema(s)) accessible by the object types registry server. The asset management repository may be a dedicated device and/or a part of a larger repository.

The term "asset management repository" refers to a structured data set or repository for storing one or more directed graph structures comprising one or more data objects, object types, object type identifier nodes, object attributes, object attribute identifier nodes, object version identifiers, updated object version identifiers, and/or object version identifier nodes accessible by the object types registry server. The asset management repository may be a dedicated device and/or a part of a larger repository.

The term "attribute creation request" refers to an electronic request to generate an attribute for an object, wherein the object may be a previously generated and stored object within the asset management system which is already associated with one or more object attribute identifiers and/or one or more object type identifiers. In some embodiments, the object may be a newly generated object not associated within one or more object attribute identifiers or object type identifiers. A user, operating a client device, may transmit an attribute creation request through the client device to the network service cloud (e.g., network 102 of FIG. 1). For example, a user may input an attribute creation request which may comprise an object query comprising a selected object type identifier for a specified object. The attribute creation request may comprise an electronic request to generate a new object attribute identifier for a specific object (e.g., an object identified by an object type identifier and/or an object identifier). In some embodiments, the attribute creation request may comprise a request to generate a new object and new object attribute identifier(s) and new object type identifier(s). In some embodiments, the previously generated objects are stored in an asset management repository (e.g., asset management repository 225 of FIG. 1).

The term "version type," or "version types," refers to a version or release type of an object. For example, an object type identifier may comprise ASCII text, a pointer, a memory address, and the like. In some embodiments, the version type of an object may be denoted by a prime of the parent version of the object (e.g., Object A'—shown as Object A'615 of FIG. 6—may be used to denote an updated version of Object A—shown as Object A 610 of FIG. 6—and may comprise an updated object type identifier and/or updated object attribute identifier assigned or generated for the Object A' at a later time than the generation of Object A in the asset management system). In some embodiments, the object version type may continuously be updated within the asset management system and one or more versions of an object may be updated into a schema such that a single schema may comprise all object version types (e.g., a plurality of version types) and the associated object type identifiers and/or object attribute identifiers of each object version type. In some embodiments, the version types of each object may be stored in the asset management repository 225 of FIG. 1.

The term "object version identifier" refers to one or more items of data by which an updated object version of an asset management system may be uniquely identified. For example, an object type identifier may comprise ASCII text, a pointer, a memory address, and the like.

The term "object version query" refers to a request received from a computing device to the asset management system comprising at least one of an object identifier, object type identifier, object attribute identifier, object version identifier, and/or other such identifiers associated with an object of the asset management system. In some embodiments, the object version query may comprise ASCII text, a pointer, a memory address, and the like, which may be used to identify one or more objects and associated object version identifiers.

The term "object version type schema" refers to a structure of object types that comprises one or more object version identifier node(s) and object type identifier node(s), and one or more edges connecting one or more objects comprising one or more object type identifiers, object attribute identifiers, and at least one object version identifier. For example, the object version identifiers and associated object version identifier nodes may be used by the asset management system to associate a previous or historical object (e.g., previously generated object) with an updated object (e.g., a historical Object A may be associated with an updated version of Object A') within an object version type schema. An example embodiment of an object version type schema may be shown in FIG. 6 as Object A (610) and Object A' (615) and/or Object B (660) and Object B' (665). In some embodiments, the object attribute identifiers for each of the objects may also be updated as a newer version of the previous object attribute identifier of the historical object (e.g., Attribute 1 (620 of FIG. 6) may be the previous or prior version of Attribute 1' (630) associated with Object A (610) and Object A' (615)). In some embodiments, the object version type schema may be stored in asset management repository 225 of FIG. 1 and/or the directed graph structure repository 230 of FIG. 1.

The term "category type identifier" refers to one or more items of data by which a plurality of object type identifiers associated with a category type identifier such that a category type identifier may comprise a plurality of object type identifiers having the same or similar object attribute identifiers and/or associated objects. For example, a category type identifier may comprise ASCII text, a pointer, a memory address, and the like.

The term "incident identifier" refers to one or more items of data by which an incident of an object of an asset management system may be uniquely identified. For example, an incident identifier may comprise ASCII text, a pointer, a memory address, and the like.

The term "change identifier" refers to one or more items of data by which a change in an object of an asset management system may be uniquely identified. For example, a change identifier may comprise ASCII text, a pointer, a memory address, and the like.

The term "client device" refers to computer hardware and/or software that is configured to access a service made available by a server. The server is often (but not always) on another computer system, in which case the client device accesses the service by way of a network. Client devices include, without limitation, smart phones, tablet computers, laptop computers, wearables, personal computers, enterprise computers, and the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client device," "computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term client device, or the like, may refer to computer hardware and/or software that is configured to access one or more of an application, a service, or repository made available by a server. The server is often, but not always, on another computer system, in which case the client accesses the service by way of a network. Embodiments of client devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "circuitry" may refer to: hardware-only circuit implementations (e.g., implementations in analog circuitry and/or digital circuitry); combinations of circuits and one or more computer-program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of circuitry applies to all uses of this term herein, including in any claims. Additionally, the term circuitry may refer to purpose-built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

As used herein, the term "user identifier" refers to one or more items of data by which a user may be identified within an asset management system. For example, a user identifier may comprise ASCII text, a pointer, an IP address, a MAC address, a memory address, or other unique identifier.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "set" or "subset" refer to a collection of zero or more items.

The term "plurality" refers to two or more items.

The term "or" is used herein in both the alternative and conjunctive sense, unless otherwise indicated.

Example System Architecture

Methods, apparatuses, systems, and computer-program products of the present disclosure may be embodied by any of a variety of computing devices. For example, the method, apparatus, system, and computer-program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
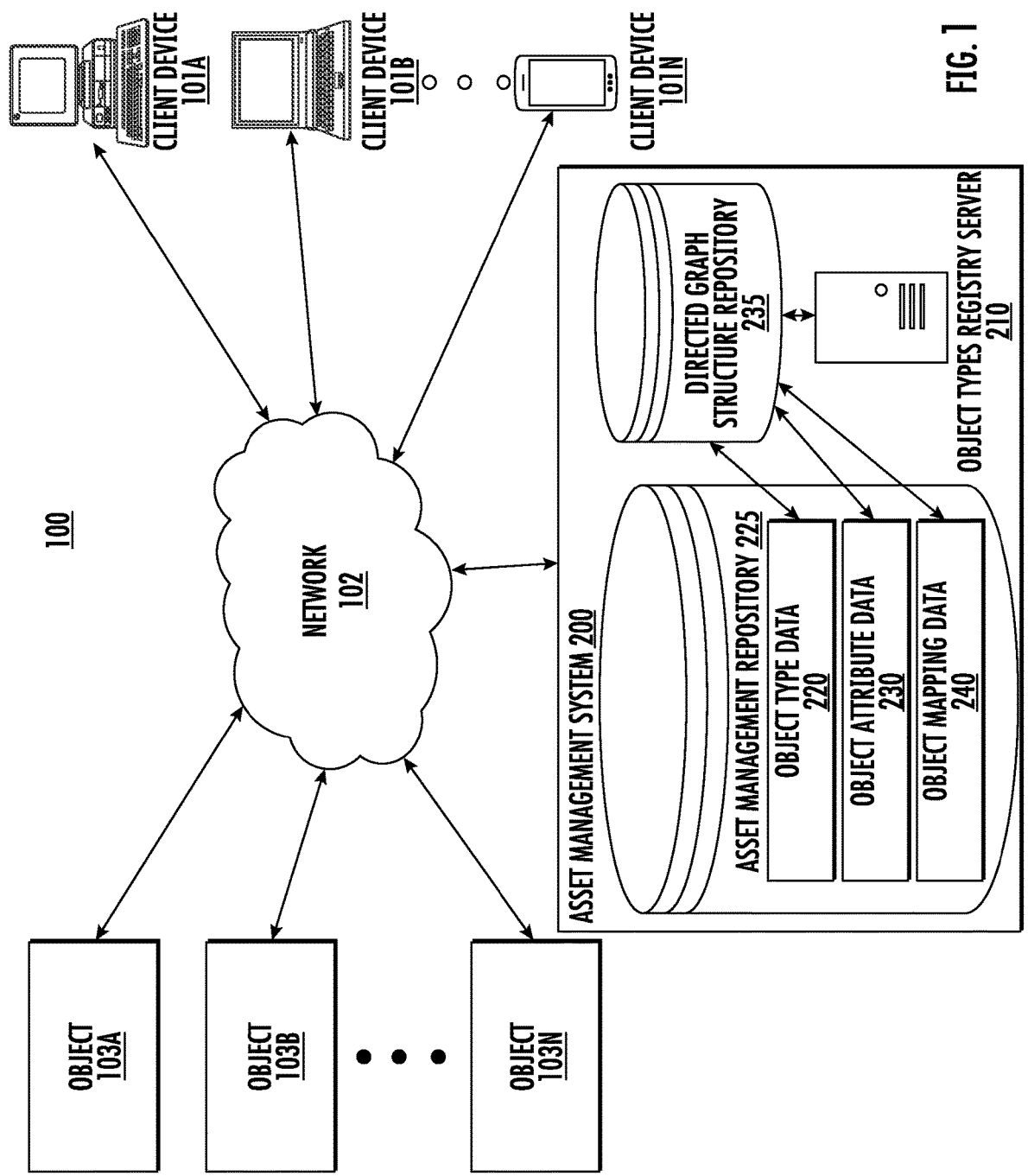
FIG. 1 is a block diagram of an example asset management system in communication with one or more computing devices over a network, within which one or more embodiments of the present invention may operate.

With reference to FIG. 1, an example computing system 100 within which some embodiments of the present disclosure operate is illustrated. In particular, FIG. 1 illustrates an asset management system 200 configured to communicate with one or client devices 101A-101N in accordance with some example embodiments described herein. Users may access an asset management system 200 via a communications network 102 using one or more of client devices 101A-101N asset management system 200 may comprise an object types registry server 210 in communication with at least one repository, such as asset management repository 225 and/or directed graph structure repository 235. Such repository(ies) may be hosted by asset management server 210 (of FIG. 2) or otherwise hosted by devices in communication with the object types registry server 210. The asset management system 200 is, in some embodiments, able to generate an object types registry interface in association with the asset management system 200, as will be described below.

Object types registry server 210 may include circuitry, networked processors, or the like configured to perform some or all of the object types registry server-based processes described herein (e.g., generating a plurality of object type identifiers, a plurality of object attribute identifiers, a selected object type schema; receiving a one or more of an object query(ies); traversing a generated directed graph structure; and rendering a selected object type schema for rendering on an object types registry interface to client devices 101A-101N, using data from, for example, the asset management repository 225 and/or the directed graph structure repository 235), and may be any suitable network server and/or other type of processing device. In this regard, the object types registry server 210 may be embodied by any of a variety of devices, for example, the object types registry server 210 may be embodied as a computer or a plurality of computers. For example, the object types registry server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, object types registry server 210 may be located remotely from the asset management repository 225 and/or the directed graph structure repository 235, although in other embodiments, the object types registry server 210 may comprise the asset management repository 225 and/or the directed graph structure repository 235. The object types registry server 210 may, in some embodiments, comprise several servers or computing devices performing interconnected and/or distributed functions. Despite the many arrangements contemplated herein, the object types registry server 210 is shown and described herein as a single computing device to avoid unnecessarily overcomplicating the disclosure.

The object types registry server 210 can communicate with one or more client devices 101A-101N via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the asset management system 200.

The asset management repository 225 and/or the directed graph structure repository 235 may be stored by any suitable storage device configured to store some or all of the information described herein (e.g., memory 201 of the object types registry server 210 or a separate memory system separate from the object types registry server 210, such as one or more database systems, backend data servers, network databases, cloud storage devices, or the like provided by another device (e.g., online application or 3rd party provider), such as a Network Attached Storage (NAS) device or devices, or as a separate database server or servers). Asset management repository 225 and/or directed graph structure repository 235 may comprise data received from the object types registry server 210 (e.g., via a memory 201 and/or processor(s) 202) and/or a client device 101A-101N, and the corresponding storage device may thus store this data. Asset management repository 225 and/or directed graph structure repository 235 may include information accessed and stored by the object types registry server 210 to facilitate the operations of the asset management system 200. As such, the asset management repository 225 and/or directed graph structure repository 235 may include, for example, without limitation, object type data such as object type identifier(s), object attribute data such as object attribute identifier(s), object mapping data, object type identifier node(s), object attribute identifier node(s), object type schema(s), directed graph structure(s), and/or the like.

The client devices 101A-101N may be implemented as any computing device as defined above. That is, the client devices 101A-101N may also include circuitry, networked processors, or the like configured to perform some or all of the apparatus-based processes described herein, and may include a suitable network server and/or other type of processing device (e.g., a controller or computing device of the client devices 101-101N). Electronic data received by the object types registry server 210 from the client devices 101A-101N may be provided in various forms and via various methods. For example, the client devices 101A-101N may include desktop computers, laptop computers, smartphones, netbooks, tablet computers, wearables, and/or other networked device, that may be used for any suitable purpose in addition to presenting the object types registry interface to a user and otherwise providing access to the asset management system 200. The depictions in FIG. 1 of "N" client devices are merely for illustration purposes. According to some embodiments, the client devices 101A-101N may be configured to display an interface on a display of the client device for viewing, editing, and/or otherwise interacting with at least one object types registry interface, which may be provided by the asset management system 200.

In embodiments where a client device 101A-101N is a mobile device, such as a smartphone or tablet, the client device 101A-101N may execute an "app" to interact with the asset management system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 101A-101N may interact with the asset management system 200 via a web browser. As yet another example, the client devices 101A-101N may include various hardware or firmware designed to interface with the asset management system 200. Example embodiments contemplated herein may have various form factors and designs but will nevertheless include at least the components illustrated in FIG. 2 and described in connection therewith.

Example Apparatuses for Implementing Embodiments of the Present Disclosure

Figure 2:
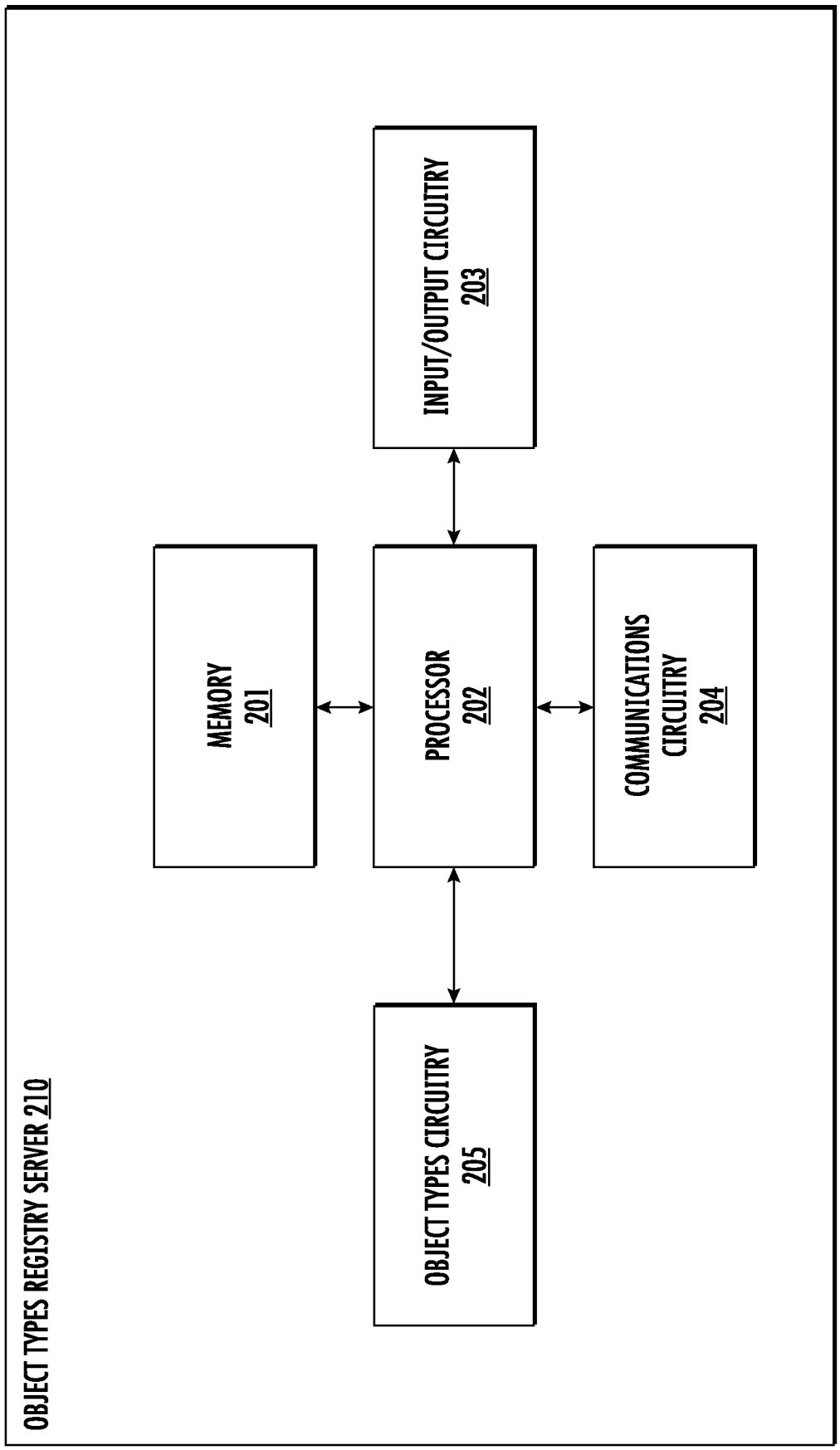
FIG. 2 is a block diagram of an example asset management apparatus configured in accordance with one or more embodiments of the present disclosure.

FIG. 2 shows a schematic block diagram of example circuitry, some or all of which may be included in an object types registry server 210. In accordance with some example embodiments, object types registry server 210 may include various means, such as memory 201, processor 202, input/output circuitry 203, and/or communications circuitry 204. Moreover, in some embodiments, object types circuitry 205 may also or instead be included in the object types registry server 210. For example, where object types circuitry 205 is included in object types registry server 210, object types circuitry 205 may be configured to facilitate the functionality discussed herein regarding generating, causing storage of, updating, and/or retrieving object types registry interface(s). An apparatus, such as object types registry server 210, may be configured, using one or more of the circuitry 201, 202, 203, 204, and 205, to execute the operations described above with respect to FIG. 1 and below in connection with FIGS. 3, 4, 5, 6, 7, 8, and 9.

Although the use of the term "circuitry" as used herein with respect to components 201-205 are described in some cases using functional language, it should be understood that the particular implementations necessarily include the use of particular hardware configured to perform the functions associated with the respective circuitry as described herein. It should also be understood that certain of these components 201-205 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the object types registry server 210 may be housed within this device, while other components are housed within another of these devices, or by yet another device not expressly illustrated in FIG. 1.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the object types registry server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, object types registry server 210. The memory 201 is non-transitory and may include, for example, one or more volatile and/or non-volatile memories, or some combination thereof. In other words, for example, the memory 201 may be an electronic storage device (e.g., a non-transitory computer readable storage medium). The memory 201 may be configured to store information, data, content, applications, instructions, or the like, for enabling an apparatus, e.g., object types registry server 210, to carry out various functions in accordance with example embodiments of the present disclosure.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling object types registry server 210 to carry out various functions in accordance with example embodiments discussed herein. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by object types registry server 210 during the course of performing its functionalities.

Processor 202 may be embodied in a number of different ways and may, for example, include one or more processing devices configured to perform independently. Additionally, or alternatively, processor 202 may include one or more processors configured in tandem via a bus to enable independent execution of instructions, pipelining, and/or multithreading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as object types registry server 210. The plurality of processors may be in operative communication with each other and may be collectively configured to perform one or more functionalities of object types registry server 210 as described herein.

In an example embodiment, processor 202 is configured to execute instructions stored in the memory 201 or otherwise accessible to processor 202. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause object types registry server 210 to perform one or more of the functionalities of object types registry server 210 as described herein.

In some embodiments, object types registry server 210 further includes input/output circuitry 203 that may, in turn, be in communication with processor 202 to provide an audible, visual, mechanical, or other output and/or, in some embodiments, to receive an indication of an input from a user, a client device 101A-101N, or another source. In that sense, input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface and may comprise a web user interface, a mobile application, a kiosk, or the like. The processor 202 and/or user interface circuitry comprising the processor 202 may be configured to control one or more functions of a display or one or more user interface elements through computer-program instructions (e.g., software and/or firmware) stored on a memory accessible to the processor 202 (e.g., memory 201, and/or the like). In some embodiments, aspects of input/output circuitry 203 may be reduced as compared to embodiments where object types registry server 210 may be implemented as an end-user machine or other type of device designed for complex user interactions. In some embodiments (like other components discussed herein), input/output circuitry 203 may even be eliminated from object types registry server 210. Input/output circuitry 203 may be in communication with memory 201, communications circuitry 204, and/or any other component(s), such as via a bus. Although more than one input/output circuitry and/or other component can be included in object types registry server 210, only one is shown in FIG. 2 to avoid overcomplicating the disclosure (e.g., like the other components discussed herein).

Communications circuitry 204, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with object types registry server 210. In this regard, communications circuitry 204 may include, for example, a network interface for enabling communications with a wired or wireless communication network. For example, in some embodiments, communications circuitry 204 is configured to receive and/or transmit any data that may be stored by memory 201 using any protocol that may be used for communications between computing devices. For example, communications circuitry 204 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications circuitry 204 includes circuitry for interacting with the antenna(s) to cause transmission of signals via the antenna(e) or to handle receipt of signals received via the antenna(e). These signals may be transmitted by object types registry server 210 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of object types registry server 210, such as via a bus.

In some embodiments, object types circuitry 205 may also or instead be included and configured to perform the functionality discussed herein related to generating and updating an object types registry interface(s). In some embodiments, object types circuitry 205 includes hardware, software, firmware, and/or a combination of such components, configured to support various aspects of such object types registry interface-related functionality, features, and/or services of the object types registry server 210 as described herein (e.g., designed to generate an object types registry interface based upon at least one or more selected object type schema). It should be appreciated that in some embodiments, object types circuitry 205 performs one or more of such exemplary actions in combination with another set of circuitry of the object types registry server 210, such as one or more of memory 201, processor 202, input/output circuitry 203, and communications circuitry 204. For example, in some embodiments, object types circuitry 205 utilizes processing circuitry, such as the processor 202 and/or the like, to perform one or more of its corresponding operations. In a further example, and in some embodiments, some or all of the functionality object types circuitry 205 may be performed by processor 202. In this regard, some or all of the example processes and algorithms discussed herein can be performed by at least one processor 202 and/or object types circuitry 205. It should also be appreciated that, in some embodiments, object types circuitry 205 may include a separate processor, specially configured field programmable gate array (FPGA), or application specific interface circuit (ASIC) to perform its corresponding functions.

Additionally or alternatively, in some embodiments, object types circuitry 205 utilizes memory 201 to store collected information. For example, in some implementations, object types circuitry 205 includes hardware, software, firmware, and/or a combination thereof, that interacts with at least one of the asset management repository 225, directed graph structure repository 235, and/or memory 201 to send, retrieve, update, and/or store data values embodied by and/or associated with object types registry interface data, object type identifier(s), object attribute identifier(s), object mapping data, object type identifier node(s), object attribute identifier node(s), directed graph structures, object type schemas, and associated data that is configured for association with, for example, generating and/or updating an object types registry interface, and to support the operations of the object types circuitry 205 and the remaining circuitry. Additionally or alternatively, in some embodiments, object types circuitry 205 utilizes input/output circuitry 203 to facilitate user output (e.g., causing rendering of one or more user interface(s) such as an object types registry interface), and/or to receive user input (e.g., user clicks, user taps, keyboard interactions, user gesture, and/or the like). Additionally or alternatively still, in some embodiments, the object types circuitry 205 utilizes communications circuitry 204 to initiate transmissions to another computing device, receive transmissions from another computing device, communicate signals between the various sets of circuitry as depicted, and/or the like.

Accordingly, non-transitory computer readable storage media can be configured to store firmware, one or more application programs, and/or other software, which include instructions and/or other computer-readable program code portions that can be executed to control processors of the components of object types registry server 210 to implement various operations, including the examples shown herein. As such, a series of computer-readable program code portions may be embodied in one or more computer-program products and can be used, with a device, object types registry server 210, database, and/or other programmable apparatus, to produce the machine-implemented processes discussed herein. It is also noted that all or some of the information discussed herein can be based on data that is received, generated and/or maintained by one or more components of the object types registry server 210. In some embodiments, one or more external systems (such as a remote cloud computing and/or data storage system) may also be leveraged to provide at least some of the functionality discussed herein.

Example Operations for Generating, Updating, and/or Otherwise Managing an Asset Management System and Its Associated Object Types Registry Interface The method, apparatus (e.g., object types registry server 210), and computer-program product of an example embodiment will now be described in conjunction with the operations illustrated in FIGS. 3, 4, and 5.

Figure 3:
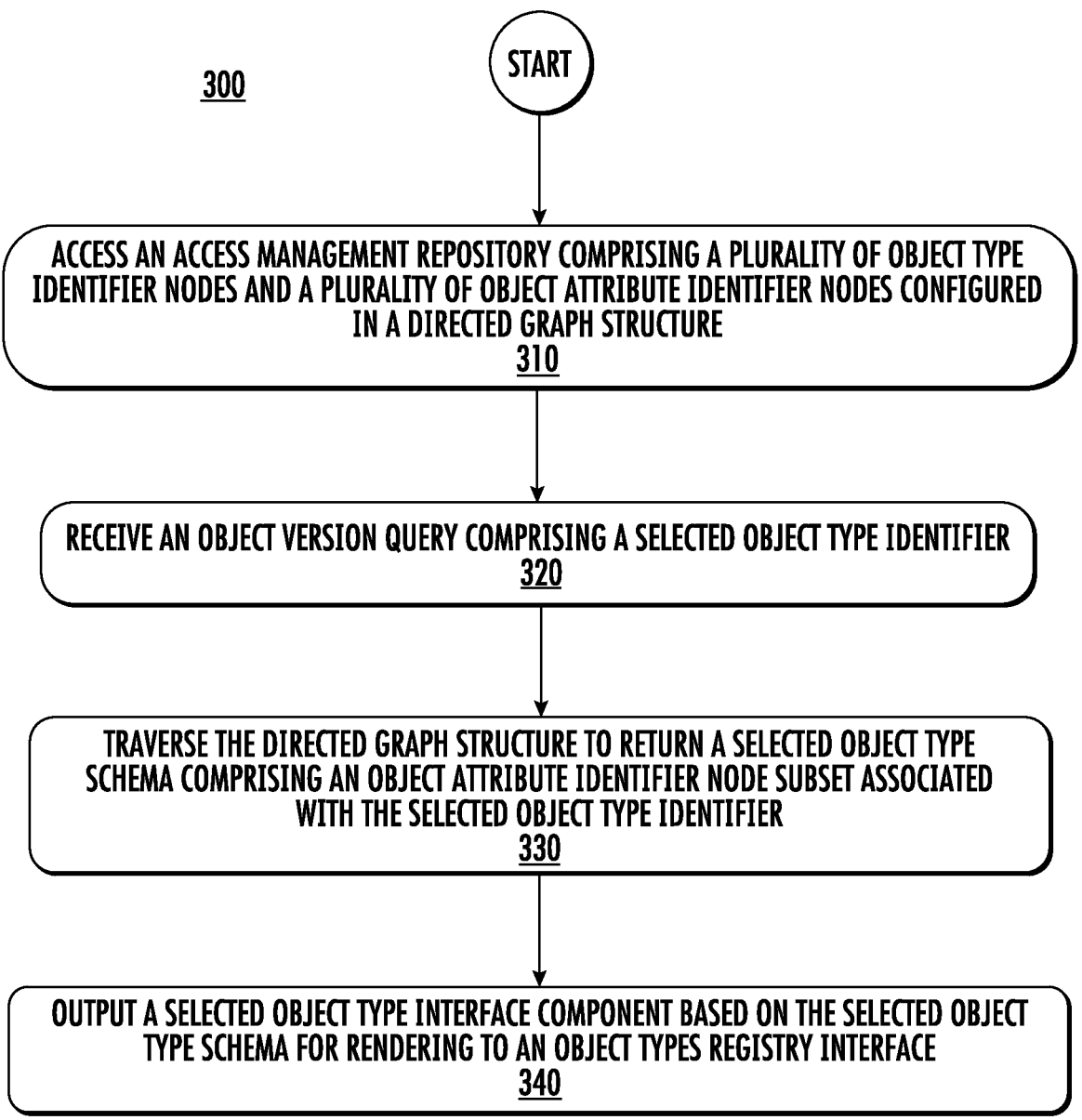
FIG. 3 is a flowchart diagram of an example process for rendering a selected object type interface component on an object types registry interface associated with an example asset management system in accordance with one or more embodiments of the present disclosure.

FIG. 3 depicts a flowchart which broadly illustrates a series of operations or process blocks for object types registry interface generation in association with an asset management system, in accordance with some example embodiments of the present disclosure. The operations illustrated in FIG. 3 may, for example, be performed by, with the assistance of, and/or under the control of one or more apparatuses, such as object types registry server 210, as described above. In this regard, performance of the operations may invoke one or more of memory 201, processor 202, input/output circuitry 203, communications circuitry 204, and/or object types circuitry 205. Certain operations may be considered optional, as indicated by the dashed lines.

As shown at operation 310, the apparatus (e.g., object types registry server 210) includes means, such as processor 202, input/output circuitry 203, communications circuitry 204, object types circuitry 205, and/or the like, for accessing an access management repository comprising a plurality of object type identifier nodes and a plurality of object attribute identifier nodes configured in a directed graph structure. By way of example, an access management repository, such as asset management repository 225, may comprise a plurality of object type identifiers and/or a plurality of object attribute identifiers in a single database or across a plurality of databases. Such identifiers (e.g., object type identifiers and/or object attribute identifiers) may be associated within the asset management repository with a plurality of object type identifier nodes and object attribute identifier nodes comprised within a second repository, such as directed graph structure repository 235 shown in FIG. 1. In some embodiments, the object type identifier nodes and object attribute identifier nodes may be stored in the same repository 225 as the object type identifiers and object attribute identifiers, such as the asset management repository and/or the directed graph structure repository 235.

Figure 6:
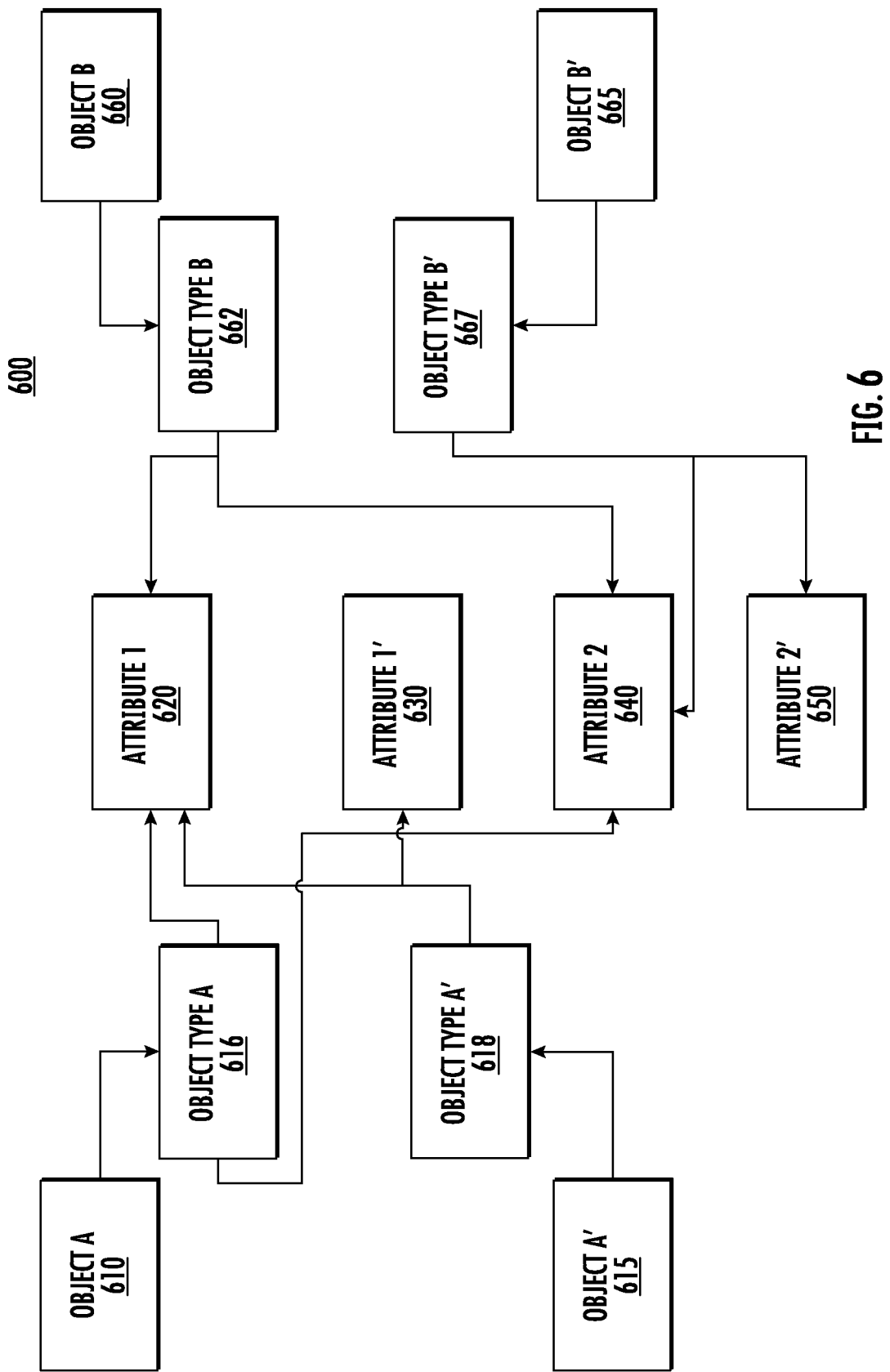
FIG. 6 is a graph diagram of an example schema comprising one or more version types of associated object data, wherein the schema is associated with an example asset management system in accordance with one or more embodiments of the present disclosure.
Figure 7:
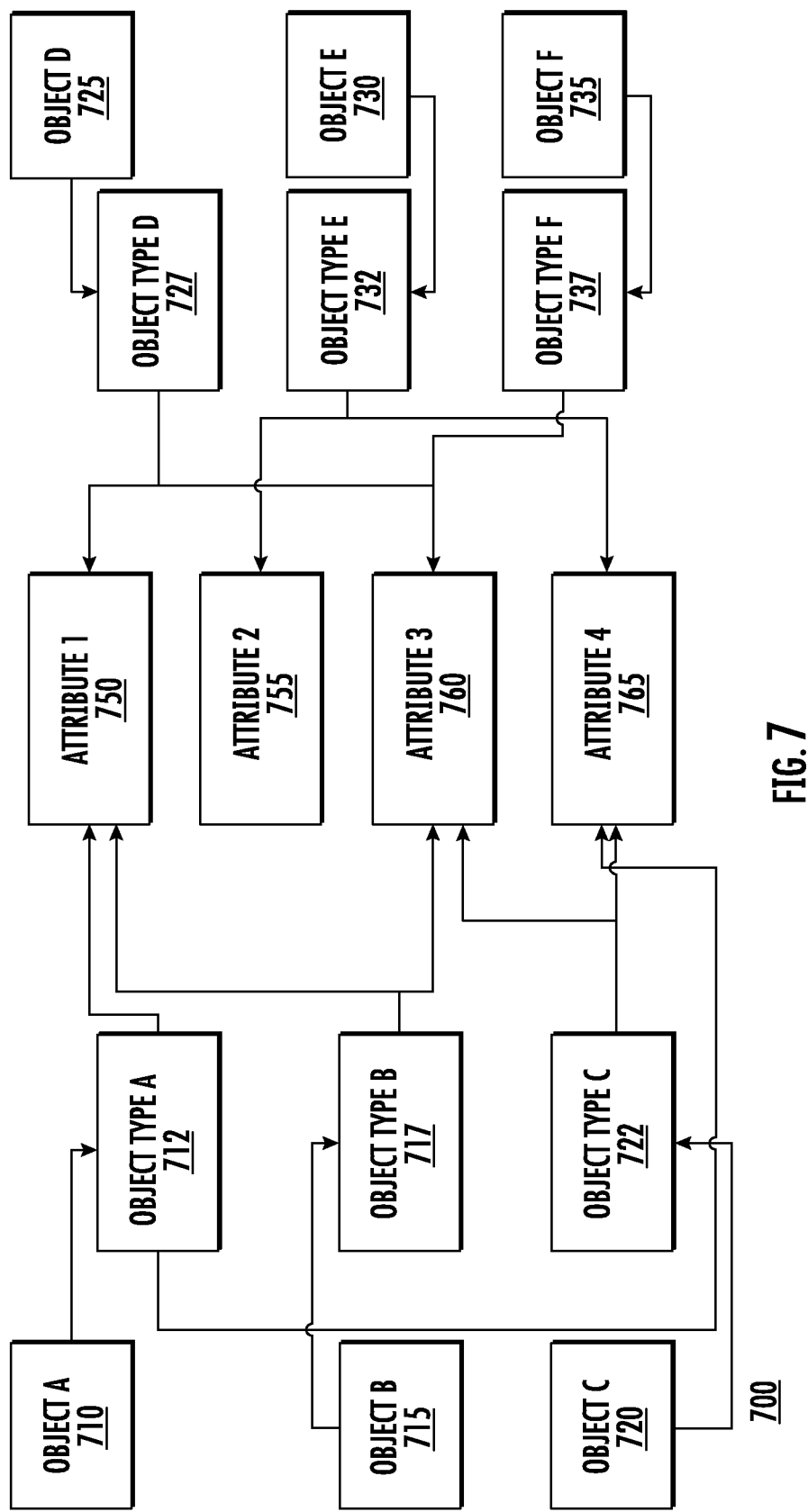
FIG. 7 is a graph diagram of an example schema comprising one or more mappings of object data to one or more attributes and object types within the example schema, wherein the schema is associated with an example asset management system in accordance with one or more embodiments of the present disclosure.
Figure 8:
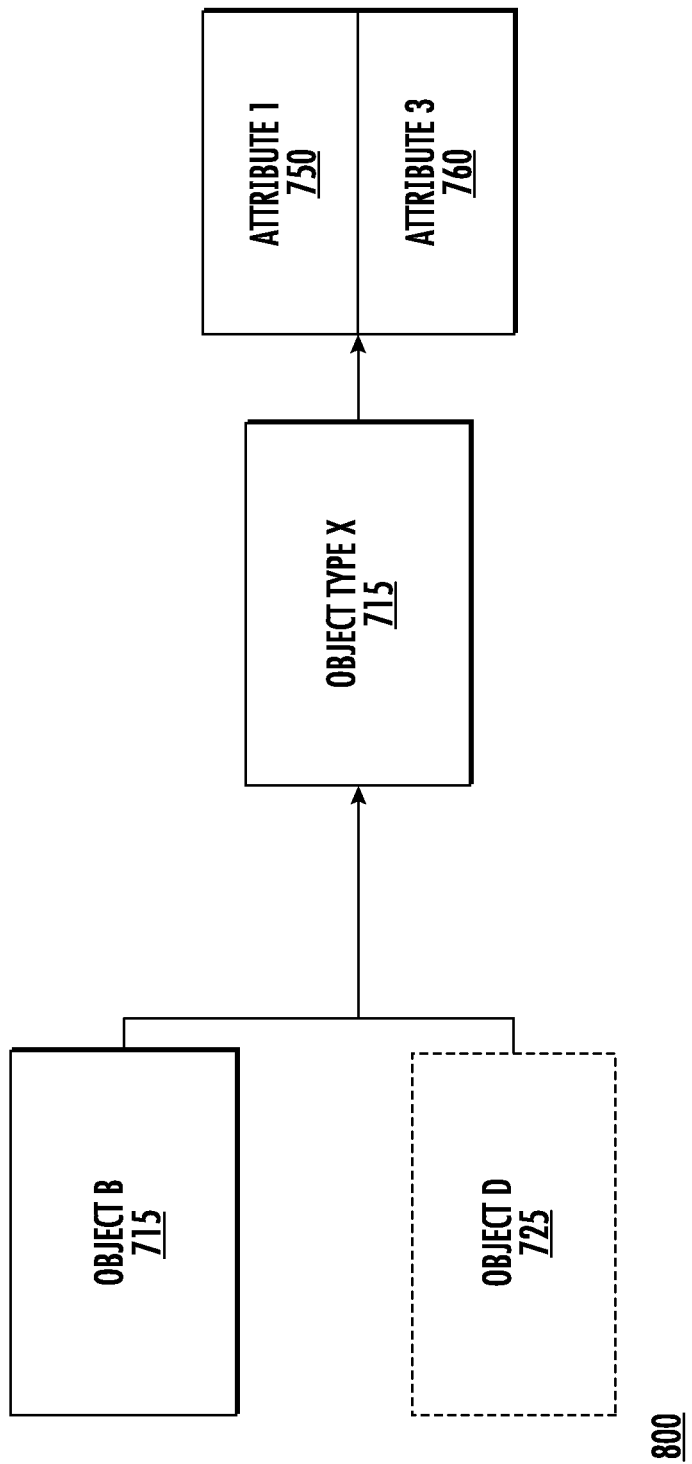
FIG. 8 is a graph diagram of an example schema generated for each object based on the mapping of attribute identifiers and object type identifier(s), wherein the schema is associated with an example asset management system in accordance with one or more embodiments of the present disclosure.

In some embodiments, the asset management repository 225 and/or the directed graph structure repository 235 may comprise object mapping data to indicate relationships and/or patterns of association between one or more object type identifiers and/or one or more object attribute identifiers by way of connecting object type identifier nodes and object attribute identifier nodes in a directed graph structure, such as that shown in exemplary embodiments like FIG. 6, FIG. 7, and FIG. 8, which are described in more detail below. In some embodiments, such object mapping data may be used by the directed graph structure to draw inferences, insights, and/or knowledge of relationships between object type identifier nodes and object attribute identifier nodes in order to generate one or more object type schemas.

As shown at operation 320, the apparatus (e.g., object types registry server 210) includes means, such as processor 202, input/output circuitry 203, communications circuitry 204, object types circuitry 205, and/or the like, for receiving an object query comprising a selected object type identifier. By way of example, an object query may be received via one or more client computing devices 101A-101N, such as that shown in FIG. 1. In some embodiments, a user of the one or more client computing devices may interact with a GUI configured by the asset management system 200 to request input by the user comprising an object query. In some embodiments, the object query may comprise a selected object type identifier which may be associated with an object (e.g., objects 103A-103N) associated with the asset management system and/or managed (e.g., controlled, supervised, and/or inspected) by the asset management system.

In some embodiments, the object type identifier may comprise data indicative of a specific object and/or specific object type, specific object version, and/or the like which may be used to identify an object in the asset management system and its associated data (e.g., object type identifier(s) and/or object attribute identifier(s)).

As shown at operation 330, the apparatus (e.g., object types registry server 210) includes means, such as processor 202, input/output circuitry 203, communications circuitry 204, object types circuitry 205, and/or the like, for traversing the directed graph structure to return a selected object type schema comprising an object attribute identifier node subset associated with the selected object type identifier. By way of example, traversing a directed graph structure may comprise moving through the directed graph structure, navigating the directed graph structure, and/or the like to identify specific object type identifier nodes and/or object attribute identifier nodes and their particular mappings between each identifier node. In some embodiments, each object type identifier node may be associated and/or linked (e.g., via object mapped data) to an object attribute identifier node, or vice versa, within a directed graph structure, such that during the process of traversing the directed graph structure the apparatus (e.g., the object types registry server 210) may determine one or more object type schemas of associated object type identifier nodes and object attribute identifier nodes.

By way of non-limiting example, after an object query comprising a selected object type identifier has been received, the apparatus (e.g., the object types registry server 210) may traverse the directed graph structure to find the object type identifier node associated with the selected object type identifier (e.g., based on an object type identifier that matches the selected object type identifier) to identify a plurality of object attribute identifier nodes connected and/or linked to the object type identifier node associated with the selected object type identifier. In some embodiments, and once the object type identifier associated with the selected object type identifier and the associated object attribute identifier nodes have been determined, a plurality of object type identifier nodes additionally connected and/or linked to the associated object attribute identifier nodes may be determined to generate and/or identify the selected object type schema of the selected object type identifier, wherein the selected object type schema comprises an object attribute identifier node subset of those object attribute identifier nodes associated with the object type identifier node of the selected object type identifier.

In some embodiments, and as described herein, the selected object type schema may comprise at least one of an object attribute identifier node subset and/or an object type identifier node subset, wherein the object type identifier node subset may show one or more connections and/or links between the object type identifier node of the selected object type identifier and associated object type identifier nodes, which are described in further detail below. By way of non-limiting example, once the object type identifier node associated with the selected object type identifier and the associated object attribute identifier nodes have been determined, a plurality of object type identifier nodes additionally connected and/or linked to the object type identifier node may be determined (e.g., either by connections by the associated object attribute identifier nodes or by direct connections to the object type identifier nodes) to generate and/or identify the selected object type schema of the selected object type identifier. In this manner, a selected object type schema may be generated and/or determined from the directed graph structure.

As shown at operation 340, the apparatus (e.g., object types registry server 210) includes means, such as processor 202, input/output circuitry 203, communications circuitry 204, object types circuitry 205, and/or the like, for outputting a selected object type interface component based on the selected object type schema for rendering to the object types registry interface. By way of non-limiting example, the object types registry interface is configured for rendering to the respective displays of the plurality of participating client devices in association with the asset management system. For instance, each client device 101A-101N may comprise a GUI configured by the object types registry interface comprising the selected object type interface component which is based on the selected object types schema described herein.

By way of example, the selected object type interface component may comprise the data indicative of the object type identifier node(s) and object attribute identifier node(s) of the object types schema, where such data to indicate the identifier node(s) may comprise object type identifier(s) and object attribute identifier(s). Thus, when the selected object type interface component is rendered on the object types registry interface, each of the object type identifiers and each of the object attribute identifiers rendered on the object types registry interface are associated with the object type identifier nodes and object attribute identifier nodes of the selected object type schema described herein, but in a renderable format.

In some embodiments, such a selected object type interface component may comprise object type identifier(s) and object attribute identifier(s) associated with the object type identifier node(s) and object attribute identifier node(s) of the object types schema, which may be stored in a memory separate from the selected object type interface component. For example, the identifier nodes associated with the object type schema may be stored in a directed graph structure repository 235, and the associated identifiers for the selected object type interface component may be stored in an asset management repository (e.g., asset management repository 225). Once the object types schema has been determined and/or generated, the object types registry server 210 may access the asset management repository with the object type schema and generate the selected object type interface component based on the identifier nodes of the object type schema. In some embodiments, once the selected object type interface component has been generated, the selected object type interface component may be output to an object types registry interface by the object types registry server 210 to one or more client devices 101A-101N.

By way of non-limiting example, such an object types registry interface comprising the selected object type interface component may be shown as interface 1400 of FIG. 14. With reference to FIG. 14, an illustration is provided broadly illustrating an example GUI configured with the selected object type schema interface component which may be generated in associated with an asset management system, in accordance with some example embodiments of the present disclosure. The illustrations in FIG. 14 may, for example, be generated by, with the assistance of, and/or under the control of one or more apparatuses, such as object types registry server 210, as described above. In this regard, generation of the GUI configured with the selected object type schema interface component may invoke one or more of memory 201, processor 202, input/output circuitry 203, communications circuitry 204, and/or object types circuitry 205.

By way of non-limiting example, the exemplary schemas of FIGS. 9, 10, 11, 12, and 13 may be renderable on an interface, such as the object types registry interface 1400 of FIG. 14, and for which the exemplary schema(s) may be used to generate a selected object type interface component, such as the selected object type interface component(s) of object types registry interface 1400. For example, the selected object type interface components of FIG. 14 may be associated with (e.g., based on) a plurality of object type identifiers (e.g., such as object type interface component host 1401 may be associated with an object type identifier host). Likewise, the other object type interface components of FIG. 14 (e.g., network assets 1402, connected device 1403, virtual guest 1404, CPU 1405, network interface 1406, operating system 1407, application service 1408, discovery 1409, scanning information 1410, configuration 1411, user 1412, file system 1413, storage device 1414, asset details 1415, database 1416, group 1417, application 1418, patch 1419, and/or license 1420) may be associated with (e.g., based on) object type identifiers (e.g., object type identifier(s) of network assets, connected device, virtual guest, CPU, network interface, operating system, application service, discovery, scanning information, configuration, user, file system, storage device, asset details, database, group, application, patch, and/or license, respectively).

Additionally, and in some embodiments, the object types registry interface may comprise object type interface components associated with a plurality of object attribute identifiers (e.g., operating system identifier, power cable identifier, and assigned employee identifier, wherein the object type interface components associated with the plurality of object attribute identifiers are not rendered on the exemplary object types registry interface 1400, but in some embodiments may be rendered on an object types registry interface). In some embodiments, the object types interface components associated with the plurality of object attribute identifiers may additionally be mapped to a plurality of the object type interface components associated with the plurality of object type identifiers.

Additionally or alternatively, the object type interface components associated with the object attribute identifiers may be rendered as being mapped to object type interface components associated with the same or different object attribute identifier node subset(s) (e.g., the object type interface component associated with a power cable identifier may additionally be mapped to the object type interface component of another power cable identifier of the object attribute identifier nodes and/or the object type interface component associated with the power cable identifier may be mapped to the object type interface component associated with an assigned employee identifier of the object attribute identifier nodes).

Figure 4:
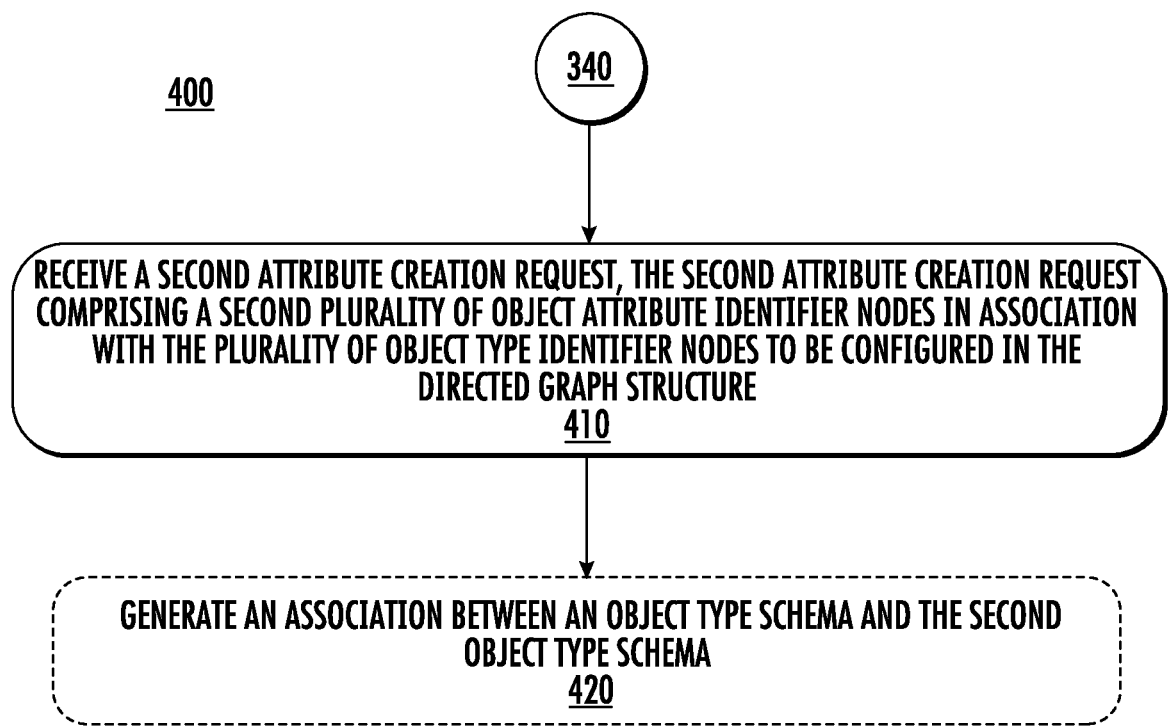
FIG. 4 is a flowchart diagram of an example process for generating an association between an object type schema and a second or new object type schema associated with an example asset management system in accordance with one or more embodiments of the present disclosure.

FIG. 4 depicts a flowchart which broadly illustrates a series of operations or process blocks for generating an association between a plurality of object type schemas (e.g., a first object type schema and a second object type schema) in association with an asset management system, in accordance with some example embodiments of the present disclosure. The operations illustrated in FIG. 4 may, for example, be performed by, with the assistance of, and/or under the control of one or more apparatuses, such as object types registry server 210, as described above. In this regard, performance of the operations may invoke one or more of memory 201, processor 202, input/output circuitry 203, communications circuitry 204, and/or object types circuitry 205. Certain operations may be considered optional, as indicated by the dashed lines.

As shown at operation 410, the apparatus (e.g., object types registry server 210) includes means, such as processor 202, input/output circuitry 203, communications circuitry 204, object types circuitry 205, and/or the like, for receiving a second attribute creation request, the second attribute creation request comprising a second plurality of attribute identifier nodes in association with the plurality of object type identifier nodes to be configured in the directed graph structure. In some embodiments, a user of a client device 101A-101N may input by an object types registry interface configured on a client device 101A-101N an attribute creation request to generate a new schema (e.g., a second object types schema) associated with a previously generated object type and associated object type identifier.

By way of non-limiting example, when a user submits or inputs a new attribute creation request (e.g., a second attribute creation request), the user may input a plurality of attribute identifier nodes (e.g., a second plurality of attribute identifier nodes) to be associated with at least one of a plurality of object type identifier nodes, which will then be configured in a directed graph structure, wherein the directed graph structure may comprise both the previously generated object type schema(s) of the object type identifier nodes and the object type schema(s) of the second attribute creation request comprising the second plurality of attribute identifier nodes and plurality of object type identifier nodes. In some embodiments, a directed graph structure may comprise its own object types schema comprising one object type identifier node to a plurality of object attribute identifier nodes, wherein the one object type identifier node may be mapped to both a first plurality of attribute identifier nodes (e.g., a previously generated object types schema comprising a previously generated object type identifier node to a previously generated plurality of attribute identifier nodes) and a second plurality of object attribute identifier nodes to generate a specific object type schema.

In some embodiments, a directed graph structure may comprise a plurality of previously generated object type identifier nodes, which may be associated with previously generated object type identifiers, and newly generated object attribute identifier nodes (e.g., a second plurality of object attribute identifier nodes associated with a second plurality of object attribute identifiers) to generate an updated and/or new object types schema(s) for previously generated object type identifier(s) and/or object type identifier node(s). In this manner, previously generated object type identifier node(s) may be reused or recycled in a new object type schema(s) (e.g., second object type schema(s)). Such reused or recycled object type identifier(s) and their associated data may then be reused or copied into new object type schemas and/or updated with new object attribute identifier(s) which are associated by object attribute identifier node(s) within the directed graph structure, without the potential loss of data or the potential inefficiency of re-generating object type data, object type identifier(s), and/or object type identifier node(s).

In some embodiments, this attribute creation request (e.g., a second attribute creation request) may be received on its own without a previous selected object type schema being generated and/or determined, and without an output of a selected object type interface component to an object types registry interface, such as that shown at operation 340. Alternatively, and in some embodiments, the operation 410 of receiving an attribute creation request (e.g., a second attribute creation request) may occur in parallel or after operation 340 of FIG. 3 such that the reception of the attribute creation request is received at the same time or after the selected object type interface component is rendered.

As shown at operation 420, the apparatus (e.g., object types registry server 210) includes means, such as processor 202, input/output circuitry 203, communications circuitry 204, object types circuitry 205, and/or the like, for generating an association between an object type schema and the second object type schema. By way of non-limiting example, and in some embodiments, once a new attribute creation request (e.g., a second attribute creation request) has been received, an association between a previously generated object type schema and a new object type schema may be generated based on shared object attribute identifier nodes between the previously generated object type schema and the new object type schema. For instance, and as shown in FIG. 7, certain object type identifier nodes may be mapped to the same object attribute identifier nodes to generate a schema comprising different object type identifier nodes (e.g., object type identifier nodes, Object Type A 712 and Object Type B 717, are both mapped to object attribute identifier node, Attribute 1 750, and may be used to generate one object types schema comprising different object type identifier nodes).

Similarly, if object type identifier node, Object Type A 712, is mapped within one object types schema (e.g., previously generated object types schema) to both object attribute identifier nodes Attribute 1 and Attribute 4, and then a new attribute creation request is received and identifies Attribute 4 for object type identifier node, Object Type F 737, then Object A 710 (associated with Object Type A 712) and Object F 735 (associated with Object Type F 737) may be mapped in a new object types schema based on a shared object attribute identifier node Attribute 4 as well as previously generated object types schema comprising Object A and Attribute 1. In this example, Object A and/or Object Type A 712, and the associated previously generated schema(s), may now be associated by a shared object attribute identifier node (Object F) and other such data (e.g., object type identifier nodes and/or object attribute identifier nodes) within both schemas.

In some embodiments, both object type schemas (e.g., a previously generated object type schema and a second, or new, object type schema) may be stored in single memory or repository (e.g., a directed graph structure repository 235 and/or an asset management repository 225). In some embodiments, all object type schemas may be stored in a single memory or repository (e.g., a directed graph structure repository 235 and/or an asset management repository 225).

Figure 5:
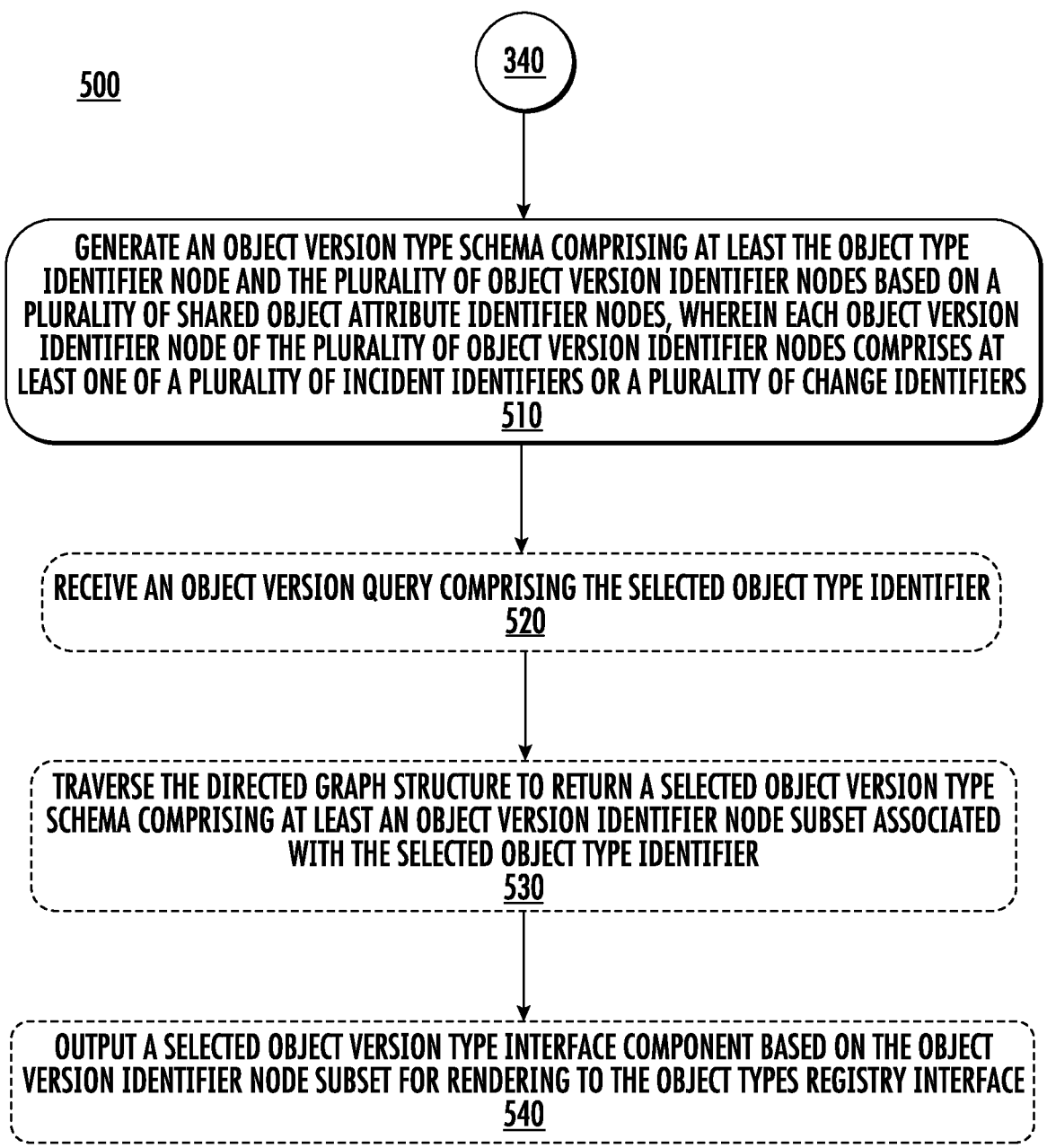
FIG. 5 is a flowchart diagram of an example process for rendering a selected object version type interface component on an object types registry interface associated with an example asset management system in accordance with one or more embodiments of the present disclosure.

FIG. 5 depicts a flowchart which broadly illustrates a series of operations or process blocks for generating and outputting a selected version identifier node subset for rendering to the object types registry interface in association with an asset management system, in accordance with some example embodiments of the present disclosure. The operations illustrated in FIG. 5 may, for example, be performed by, with the assistance of, and/or under the control of one or more apparatuses, such as object types registry server 210, as described above. In this regard, performance of the operations may invoke one or more of memory 201, processor 202, input/output circuitry 203, communications circuitry 204, and/or object types circuitry 205. Certain operations may be considered optional, as indicated by the dashed lines.

As shown at operation 510, the apparatus (e.g., object types registry server 210) includes means, such as processor 202, input/output circuitry 203, communications circuitry 204, object types circuitry 205, and/or the like, for generating a version object type schema comprising at least the object type identifier node and the plurality of object version identifier nodes based on a plurality of shared object attribute identifier nodes, wherein each object version identifier node of the plurality of object version identifier nodes comprises at least one of a plurality of incident identifiers or a plurality of change identifiers. In some embodiments, the generation of a version object type schema may be received on its own without a previous selected object type schema being generated and/or determined, and without an output of a selected object type interface component to an object types registry interface, such as that shown at operation 340. Alternatively, and in some embodiments, the operation 510 of generating a version object type schema may occur in parallel or after operation 340 of FIG. 3 such that the version object type schema is generated at the same time or after the selected object type interface component is rendered.

By way of non-limiting example, an object version type schema may be generated by at least one object type identifier and an associated object type identifier node previously generated and the plurality and associated of at least one shared object attribute identifier node associated with the previously generated object type identifier and once a change or incident has occurred on the associated object of the object type identifier/object type identifier node, such as a change or incident identified by a change identifier or incident identifier, an object version identifier node for association with the object type identifier node is generated. In some embodiments, the object version identifier node may be attached to the object type identifier node such as that exemplarily shown in FIG. 6, which is described in more detail below. For sake of clarity, and by way of short explanation, Object A 610 and Object A' 615 may denote a previously generated object A and a new or updated object identifier node, Object A', associated with Object A, which are associated with Object Type A 616 and Object Type A' 618, respectively, and are both associated with shared object attribute identifier node, Attribute 1. Such object type identifier nodes (e.g., both the previously generated object type identifier nodes and the associated updated and/or new object type identifier nodes) may be determined and/or generated into the same object version type schema for the associated object type identifier node(s), such as an original, previously generated object type identifier node for which every associated updated and/or new object type identifier nodes stem from.

In some embodiments, and as discussed briefly above, the object version type schema may further comprise shared object attribute identifier nodes comprising at least one of a plurality of incident identifiers or a plurality of change identifiers. By way of non-limiting example, such incident identifiers may comprise data indicative of an object associated with the object type identifier node's software and/or hardware malfunctions, such as malfunctions in computer-coded instructions comprised within the object, computer functionality, data transmission issues, and/or the like.

By way of non-limiting example, once an incident of an object has been identified and recorded as an incident identifier, the apparatus (e.g., the object types registry server 210), may track and/or determine a change identifier associated with the object once a change in the software and/or hardware has been detected. In some embodiments, such change identifier may occur without an incident identifier occurring first, such that the asset management system always tracks the object and any changes to its software or hardware (e.g., a fixing of the computer-coded instructions, a fixing of the computer functionality, a fixing of the object's hardware components, improvements or general changes to data transmission, and/or the like). In some embodiments, the tracking of the object to determine changes in software or hardware may be tracked intermittently at predetermined intervals in order to improve computer functionality in tracking a multitude of objects at one time without risking over-utilization of computer use by tracking all objects at all times.

In some embodiments, and once a change identifier has been determined and associated with a previously generated object type identifier and/or previously generated object type identifier node, the apparatus (e.g., the object types registry server 210) may generate a new or updated object version identifier node to be associated with (e.g., linked and/or attached to) the object type identifier node of the object. In some embodiments, when a new object version identifier node of the object is attached to the object type identifier node of the object, a new object type identifier node is generated, and data of the previously generated object type identifier node is copied into the new object type identifier node for attachment to the object version identifier node within the object version type schema. By way of non-limiting example, such an object version type schema may be shown in FIG. 6 as a plurality of objects, such as Object A 610, are associated with a plurality of object type identifier nodes, such as Object Type A 616, and the new or updated object version identifier node associated with Object A, which may be shown as Object A' 615, wherein the prime symbol may denote the object version identifier node attached and/or associated with previously generated object type identifier node Object Type A 616 and the newly generated object type identifier node, Object Type A' 618. Both Object A 610 and Object A' 615 (and Object Type A 616 and Object Type A' 618, respectively) may be associated with Attribute 1 620 comprising previously generated object attribute identifier data, which both Object A 610 and Object A' 615 may be comprise an association. By way of non-limiting example, Object A' 615, the object type identifier node of Object Type A' 618 may denote the object version identifier node of the Object Type A 616 (e.g., by way of A "prime"), which may be associated with both object attribute identifier node Attribute 1 620 and updated Attribute 1' 630 (e.g., second attribute identifier node), and wherein Attribute 1' may denote updated or new object attribute identifier data (e.g., a second attribute identifier node) such as data comprising incident identifier data and/or change identifier data like that described hereinabove. In some embodiments, an object version type schema of object type identifier node A may comprise a mapping between Object A 610, Object A' 615, Object Type A 616, Attribute 1 620, and, in some embodiments, Attribute 1' 630 to indicate the versions of Object A and their associated object attribute identifier nodes.

As shown at operation 520, the apparatus (e.g., object types registry server 210) includes means, such as processor 202, input/output circuitry 203, communications circuitry 204, object types circuitry 205, and/or the like, for receiving an object version query comprising the selected object type identifier. By way of non-limiting example, an object version query may be received via one or more client devices 101A-101N, such as that shown in FIG. 1. In some embodiments, a user of the one or more client devices 101A-101N may interact with a GUI configured by the asset management system 200 and/or the object types registry server 210 to request input by the user comprising an object version query. In some embodiments, the object version query may comprise a selected object type identifier which may be associated with an object (e.g., objects 103A-103N) associated with the asset management system and/or managed (e.g., controlled, supervised, and/or inspected) by the asset management system.

In some embodiments, the object type version identifier may comprise data indicative (e.g., by one or more identifiers) of a specific object, specific object version, specific object version type, and/or the like which may be used to identify an object in the asset management system and its associated data (e.g., object type identifier(s) and/or object attribute identifier(s)).

As shown at operation 530, the apparatus (e.g., object types registry server 210) includes means, such as processor 202, input/output circuitry 203, communications circuitry 204, object types circuitry 205, and/or the like, for traversing the directed graph structure to return the version object type schema comprising at least an object version identifier node subset associated with the selected object type identifier. By way of non-limiting example, and similar to that described above with respect to operation 330, traversing the directed graph structure to return the object version type schema may comprise moving through the directed graph structure, navigating the directed graph structure, and/or the like to identify specific object type identifier nodes to match the selected object type identifier of the object version query. In some embodiments, each object type identifier node may be associated and/or linked (e.g., via object mapped data) to an object version identifier node and at least one object attribute identifier node within a directed graph structure, such that during the process of traversing the directed graph structure the apparatus (e.g., the object types registry server 210) may determine an object version type schema associated with the selected object type identifier, associated object type identifier nodes comprising or associated with object version identifier nodes, and associated object attribute identifier nodes.

By way of non-limiting example, after an object query comprising a selected object type identifier has been received, the apparatus (e.g., the object types registry server 210) may traverse the directed graph structure to find the object type identifier node associated with the selected object type identifier (e.g., based on an object type identifier that matches the selected object type identifier) to identify a plurality of object attribute identifier nodes connected and/or linked to the object type identifier node associated with the selected object type identifier. In some embodiments, and once the object type identifier associated with the selected object type identifier and the associated object attribute identifier nodes have been determined, a plurality of object type identifier nodes additionally connected and/or linked to the associated object attribute identifier nodes may be determined to generate and/or identify the selected object type schema of the selected object type identifier, wherein the selected object type schema comprises an object version identifier node subset of those object version identifier nodes associated with the object type identifier node of the selected object type identifier.

As shown at operation 540, the apparatus (e.g., object types registry server 210) includes means, such as processor 202, input/output circuitry 203, communications circuitry 204, object types circuitry 205, and/or the like, for outputting a selected object version type interface component based on the object version identifier node subset for rendering to the object types registry interface. By way of non-limiting example, the object types registry interface is configured for rendering to the respective displays of the plurality of participating client devices in association with the asset management system. For instance, each client device 101A-101N may comprise a GUI configured by the object types registry interface comprising the object version type interface component which is based on the selected object version type schema described herein.

By way of example, the selected object type interface component may comprise the data indicative of the object type identifier node(s), object version identifier node(s), and/or object attribute identifier node(s) of the object version types schema, where such data to indicate the identifier node(s) may comprise object type identifier(s), object version identifier(s), and/or object attribute identifier(s). Thus, when the selected object version type interface component is rendered on the object types registry interface, each of the object type identifiers, each of the object version identifiers, and/or each of the object attribute identifiers rendered on the object types registry interface are associated with the object type identifier nodes, object version identifier nodes, and/or object attribute identifier nodes of the selected object version type schema described herein, but in a renderable format.

FIGS. 3, 4, and 5 thus illustrate flowcharts describing the operation of apparatuses, methods, systems, and computer-program products according to example embodiments contemplated herein. It will be understood that each flowchart block, and combinations of flowchart blocks, may be implemented by various means, such as hardware, firmware, processor, circuitry, and/or other devices associated with execution of software including one or more computer-program instructions. For example, one or more of the operations described above may be implemented by an apparatus executing computer-program instructions. In this regard, the computer-program instructions may be stored by a memory 201 of the object types registry server 210 and executed by a processor 202 of the object types registry server 210. As will be appreciated, any such computer-program instructions may be loaded onto a computer or other programmable apparatus (e.g., hardware) to produce a machine, such that the resulting computer or other programmable apparatus implements various functions, including those functions specified in the flowchart blocks. These computer-program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer-program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Example Object Type Schemas

The method, apparatus (e.g., object types registry server 210), and computer-program product of an example embodiment will now be described in conjunction with the object type schemas exemplified and illustrated in FIGS. 6, 7, 8, 9, 10, 11, 12, 13, and 14. Additionally or alternatively, the method, apparatus (e.g., object types registry server 210), the computer-program product of an example embodiment may also be shown as a configured graphical user interface (GUI) like that shown in FIG. 14, which may comprise an object type schema in a real-world environment as shown on one or more client devices 101A-101N.

FIG. 6 depicts an illustration which broadly illustrates one or more object type schemas and/or object version type schemas which may be generated in associated with an asset management system, in accordance with some example embodiments of the present disclosure. The illustrations in FIG. 6 may, for example, be generated by, with the assistance of, and/or under the control of one or more apparatuses, such as object types registry server 210, as described above. In this regard, generation of the one or more object type schemas and/or one or more object version type schemas may invoke one or more of memory 201, processor 202, input/output circuitry 203, communications circuitry 204, and/or object types circuitry 205. By way of non-limiting example one or more object type identifier nodes, such as Object A 610, Object A' 615, Object B 660, and/or Object B' 665, may be mapped using object mapping data to one or more object attribute identifier nodes, such as Attribute 1 620, Attribute 1' 630, Attribute 2 640, and/or Attribute 2' 650.

Based on these mappings between object type identifier nodes and object attribute identifier nodes, one or more object type schemas may be generated and/or determined by an object types registry server 210. For example, an object type schema of Object A 610—if Object A was selected by an object query received by the apparatus—may comprise at least Object A 610 linked to both Attribute 1 620 and Attribute 2 640 as an object attribute identifier node subset. Likewise, and by way of non-limiting example, an object type schema of Object A' 615—if Object A' was selected by an object query received by the apparatus—may comprise at least Object A 610 linked to both Attribute 1 620 and Attribute 1' 630 as an object attribute identifier node subset. Additionally, an object type schema of Object B 660 may comprise at least Object B 660 linked to both Attribute 1 620 and Object 2 640; and an object type schema of Object B' 665 may comprise at least Object B' 665 linked to both Attribute 2 640 and Attribute 2' 650.

Based on these mappings between object type identifier nodes and object attribute identifier nodes, a plurality of version type schemas may be generated and/or determined by an object types registry server 210. For example, and based similarly on FIG. 6, an object version type schema may be generated based on a selected object type identifier and an object version identifier node subset from a directed graph structure. By way of non-limiting example, an object version type schema based on Object A 610—if Object A was selected by an object query received by the apparatus—may comprise at least Object A 610 and Object A' 615 comprising an object version identifier node of a prime identifier (e.g., A') to indicate an updated or later version of Object type A 610. In some embodiments, the object version type schema may further comprise an object attribute identifier node subset such to include a link between Object A 610 and Object A' 615 with Attribute 1 620. Additionally or alternatively, a new and/or updated object attribute identifier (e.g., a second attribute identifier node) associated with the object version identifier node within the object version type subset such as Attribute 1' 630 which may indicate an updated version of Attribute 1 620. Likewise, an object version type schema based on Object B 660—if Object B was selected by an object query received by the apparatus—may comprise at least Object B 660 and Object B' 665 to indicate an updated or later version of Object B 660. By way of non-limiting example, the object version type schema of Object B may further comprise an object attribute identifier node subset comprising at least Attribute 2 640 as a shared object attribute identifier node.

FIGS. 7 and 8 depict an illustration which broadly illustrate a plurality of objects and associated object type identifier nodes and object attribute identifier nodes which may be used to generate one or more object type schemas in association with an asset management system, in accordance with some example embodiments of the present disclosure. The illustrations in FIGS. 7 and 8 may, for example, be generated by, with the assistance of, and/or under the control of one or more apparatuses, such as object types registry server 210, as described above. In this regard, generation of the one or more object type schemas may invoke one or more of memory 201, processor 202, input/output circuitry 203, communications circuitry 204, and/or object types circuitry 205. By way of non-limiting example one or more objects, such as Object A 710, Object B 715, Object C 720, Object D 725, Object E 730, and/or Object F 735; and associated object type identifiers, such as Object Type A 712, Object Type B 717, Object Type C 722, Object Type D 727, Object Type E 732, and/or Object Type F 737, may be mapped using object mapping data to one or more object attribute identifier nodes, such as Attribute 1 750, Attribute 2 755, Attribute 3 760, and/or Attribute 4 765.

Based on these mappings between object type identifier nodes and object attribute identifier nodes, one or more object type schemas may be generated and/or determined by an object types registry server 210. For example, an object type schema of Object B 725 of FIG. 7—if Object B was selected by an object query received by the apparatus—may comprise at least Object B 715, its associated object type identifier, and the associated Attributes (e.g., the object attribute identifier node subset comprising Attribute 1 750 and Attribute 3 760 associated with the object type identifier) may be used to determine and/or generate the object types schema of Object B 725. Additionally or alternatively, where object type identifier nodes share the same or similar object attribute identifier nodes, an object type schema may be programmed to include the object type identifier nodes in the same object type schema, such as that shown in FIG. 8 as optional Object D 725 likewise linked to Object Type X 715 and its associated object attribute identifiers, Attribute 1 750 and Attribute 3 760. Likewise, an object type schema of Object E 730—if Object E was selected by an object query received by the apparatus—may comprise at least Object E 730, the associated object type identifier (e.g., Object Type X 715) and its associated Attributes (e.g., the object attribute identifier node subset comprising Attribute 2 755 and Attribute 4 765) may be used to determine and/or generate the object types schema of Object B 725.

Figure 9:
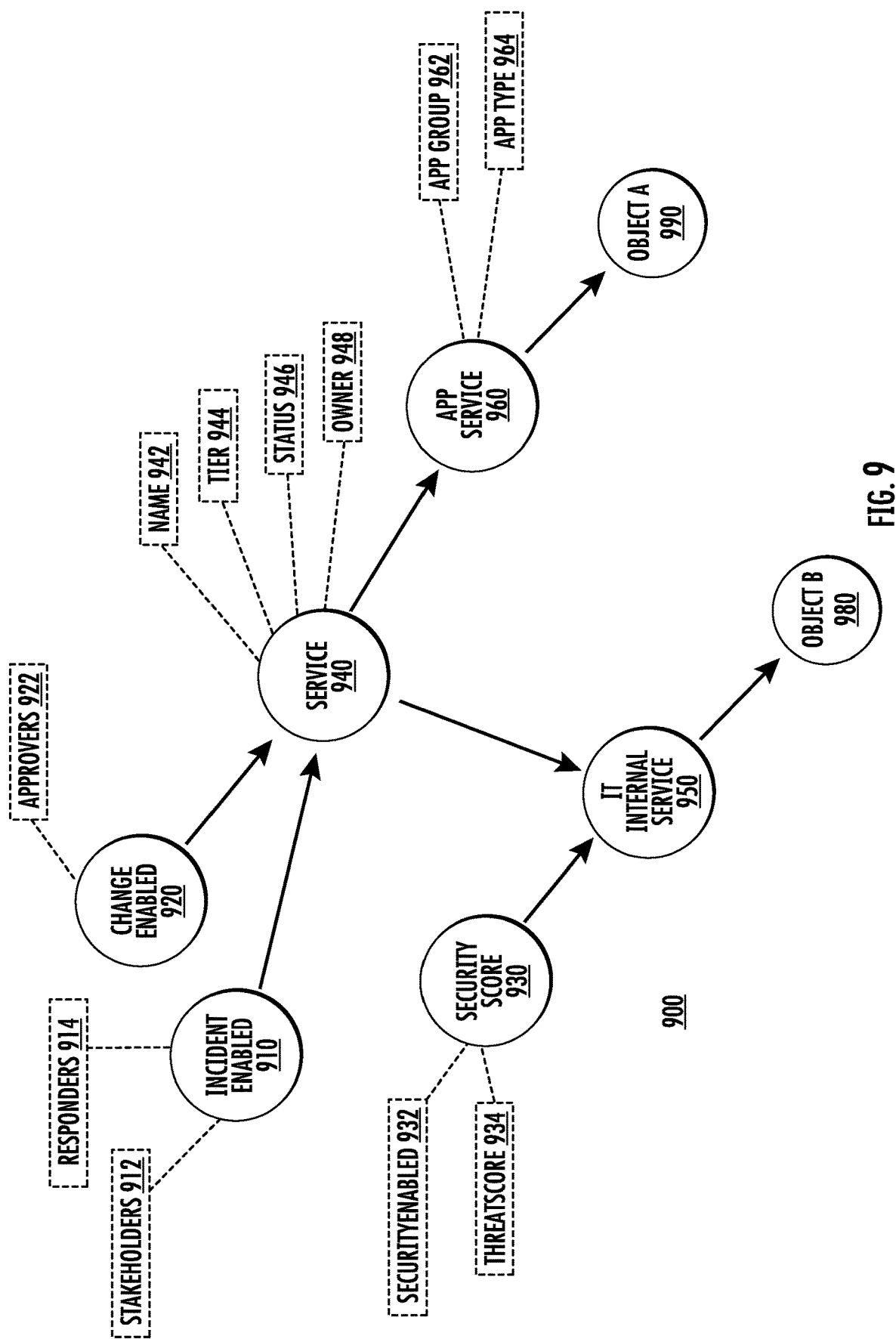
FIG. 9 is a graph diagram of an example schema generated for a plurality of objects based on the mapping of object type identifiers and object attribute identifiers, wherein the schema is associated with an example asset management system in accordance with one or more embodiments of the present disclosure.

FIG. 9 depicts an illustration which broadly illustrates exemplary object type schemas comprising a plurality of objects, each object's associated object type identifier node (s) and object attribute identifier node(s), which may be used to generate one or more selected object type schemas in association with an asset management system, in accordance with some example embodiments of the present disclosure. The illustrations in FIG. 9 may, for example, be generated by, with the assistance of, and/or under the control of one or more apparatuses, such as object types registry server 210, as described above. In this regard, generation of the one or more object type schemas may invoke one or more of memory 201, processor 202, input/output circuitry 203, communications circuitry 204, and/or object types circuitry 205.

By way of non-limiting example one or more objects, such as Object A 990 and Object B 980 may be mapped (e.g., associated) with a plurality of object type identifiers, such as the Incident Enabled 910, Change Enabled 920, Security Score 930, Service 940, IT Internal Service 950, App Service 960; and, wherein each object type identifier may comprised a plurality of object attribute identifiers (e.g., object attribute identifier nodes mapped to a plurality of object type identifier nodes), such as the Incident Enabled 910 type identifier being mapped to object attribute identifier stakeholders 912 and/or responders 914.

In some embodiments, the example object type schema(s) may comprise a plurality of object type identifier node(s) and associated object attribute identifier node(s). For example, the Change Enabled 920 object type identifier node may be mapped to an object attribute identifier node Approvers 922. Likewise, the Service 940 object type identifier node may be mapped to a plurality of attributes such as Name 942, Tier 944, Status 946, and/or Owner 948.

In addition to the mapping of the object type identifier nodes to a plurality of object attribute identifier nodes, the object type identifier nodes may also be mapped (e.g., associated) to a plurality a plurality of different or other object type identifier nodes such as the object type identifier node Service 940 is mapped to the object type identifier nodes IT Internal Service 950 and App Service 960.

In some embodiments, the object type identifier node(s) may be identified as a category type identifier, which may associate a plurality of lower-hierarchy (e.g., lower with respect to the object type identifier node associated with the category type identifier) object type identifier node(s). By way of non-limiting example, the Service 940 object type identifier may also be identified as a category type identifier which comprises (e.g., is associated with) a plurality of object type identifiers at a lower (e.g., a lower in hierarchy in an object type schema) level such as IT Internal Service 950 and App Service 960 which are both identified as an object type identifier Service 940. By way of non-limiting example, the object type identifier node App Service 960 may be mapped to a plurality of object attribute identifier nodes such as App Group 962 and/or App Type 964. By way of non-limiting example, the object type identifier node Security Score 930 may be mapped to object attribute identifier nodes Security Enabled 932 and/or Threat Score 934.

In some embodiments, the object type schema may further comprise the objects associated with the object type identifiers and object attribute identifiers, such as Object A 990 and Object B 980.

Figure 10:
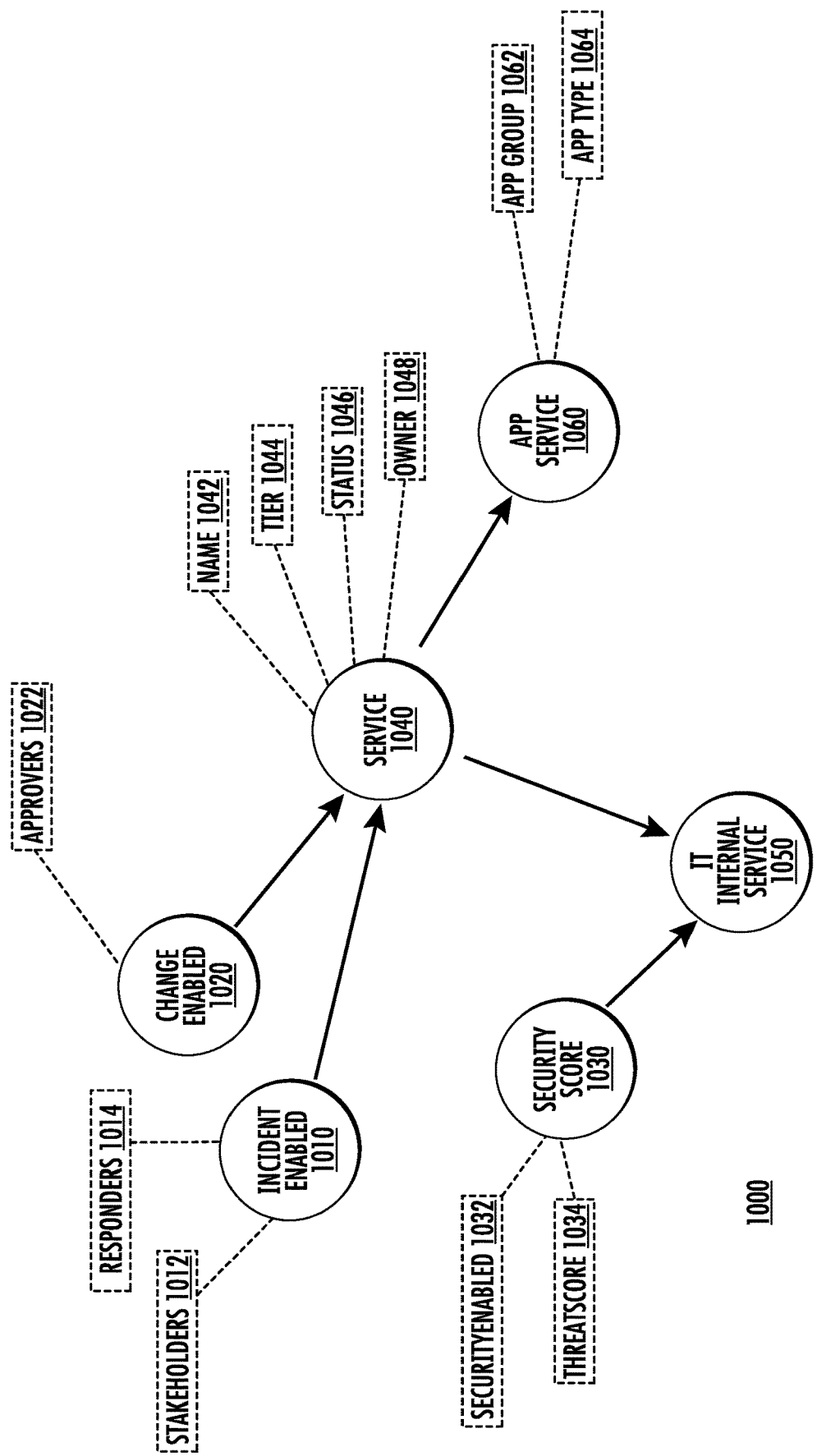
FIG. 10 is a graph diagram of an example schema generated for a plurality of object type identifiers and object attribute identifiers, wherein the schema is associated with an example asset management system in accordance with one or more embodiments of the present disclosure.

FIG. 10 depicts an illustration which broadly illustrates a plurality of object type identifier nodes and object attribute identifier nodes which may be used to generate one or more object type schemas without the associated objects for the object type identifier node(s), in accordance with some example embodiments of the present disclosure. The illustrations in FIG. 10 may, for example, be generated by, with the assistance of, and/or under the control of one or more apparatuses, such as object types registry server 210, as described above. In this regard, generation of the one or more object type schemas may invoke one or more of memory 201, processor 202, input/output circuitry 203, communications circuitry 204, and/or object types circuitry 205.

By way of non-limiting example, the one or more object type identifier nodes—such as Incident Enabled 1010, Change Enabled 1020, Security Score 1030, Service 1040, IT Internal Service 1050, App Service 1060—may comprise (e.g., be mapped and/or associated with) a plurality of object attribute identifiers—such as the Incident Enabled 1010 type identifier being mapped to object attribute identifier stakeholders 1012 and/or responders 1014. By way of non-limiting example, the Change Enabled 1020 object type identifier node may be mapped to the object attribute identifier node Approvers 1022. By way of non-limiting example, the Service 1040 object type identifier node may be mapped to a plurality of attributes such as Name 1042, Tier 1044, Status 1046, and/or Owner 1048. By way of non-limiting example, the object type identifier node App Service 1060 may be mapped to a plurality of object attribute identifier nodes such as App Group 1062 and/or App Type 1064. By way of non-limiting example, the object type identifier node Security Score 1030 may be mapped to object attribute identifier nodes Security Enabled 1032 and/or Threat Score 1034.

In addition to the mapping of the object type identifier nodes to a plurality of object attribute identifier nodes, the object type identifier nodes may also be mapped (e.g., associated) to a plurality a plurality of different or other object type identifier nodes such as the object type identifier node Service 1040 is mapped to the object type identifier nodes IT Internal Service 1050 and App Service 1060. In this manner, the Service 1040 object type identifier may also be identified as a category type identifier which comprises (e.g., is associated with) a plurality of object type identifiers at a lower (e.g., a lower in hierarchy in an object type schema) level such as IT Internal Service 1050 and App Service 1060 which are both identified as an object type identifier Service 1040.

FIG. 11 depicts an illustration which broadly illustrates an exemplary object type schema directed to plurality of object type identifier nodes and object attribute identifier nodes which may be used to generate one or more object type schemas in association with an asset management system, such as an object type schema directed to objects in a computing environment, in accordance with some example embodiments of the present disclosure. The illustrations in FIG. 11 may, for example, be generated by, with the assistance of, and/or under the control of one or more apparatuses, such as object types registry server 210, as described above. In this regard, generation of the one or more object type schemas may invoke one or more of memory 201, processor 202, input/output circuitry 203, communications circuitry 204, and/or object types circuitry 205.

By way of non-limiting example, an object type schema configured to show associated object type identifiers (e.g., object type identifier nodes) associated within a computing environment may be shown by way of object type schema 1100. For instance, the object type identifier nodes IT Asset 1115, Locatable Asset 1125, Personal Computer 1135, Desktop Computer 1145, Laptop Computer 1155, and/or the like may be shown within an object type schema associated with a computing environment.

By way of non-limiting example, the object type identifier nodes may be mapped (e.g., associated with) a plurality of object attribute identifier nodes, such as the object type identifier node IT Asset 1115 may be mapped to object attribute identifier nodes Asset ID 1118 and/or Status 1116; and, likewise, object type identifier node Locatable Asset 1125 may be mapped to object attribute identifier nodes Location ID 1126 and/or Location Geo 1128; object type identifier node Personal Computer 1135 may be mapped to object attribute identifier nodes Owner 1136 and/or CPU ID 1138; object type identifier node Laptop Computer 1155 may be mapped to object attribute identifier node Size 1156; and/or object type identifier node Desktop Computer 1145 may be mapped to object attribute identifier node Monitor 1146.

In some embodiments, a category type identifier may be identified within the object type schema where an object type identifier comprises (e.g., is associated with a plurality of object type identifier nodes at a lower hierarchy in the object type schema) a plurality of object type identifier nodes that describe a more detailed object type than the object type identifier node associated with the category type identifier. By way of non-limiting example, the object type identifier node Personal Computer 1135 may comprise the object type identifier nodes Laptop Computer 1155 and/or Desktop Computer 1145 and the object type identifier node Personal Computer 1135 may comprise a category type identifier indicating personal computers as the category of object type identifiers and/or objects associated with the particular object type schema. By way of non-limiting example, the object type identifier node IT Asset 1115 may comprise a category type identifier associated with IT assets and, wherein the category type identifier may comprise and/or be associated with a plurality of object type identifier nodes at a lower hierarchy than the object type identifier node associated with the category type identifier (e.g., IT Asset 1115). For example, the category type identifier of IT Asset 1115 may comprise the object type identifier(s) (e.g., object type identifier node(s)) of Personal Computer 1135, Desktop Computer 1145, and/or Laptop Computer 1155.

In some embodiments, the category type identifier may further comprise the associated object attribute identifier(s) (e.g., object attribute identifier node(s)) for each of the object type identifier(s).

In some embodiments, the object type schema may further comprise the associated Objects of the object type identifier node(s) and the object attribute identifier node(s), such as Object A 1190 and Object B 1180.

FIG. 12 depicts an illustration which broadly illustrates a plurality of objects and associated object type identifier nodes and object attribute identifier nodes which may be used to perform an object query of the object type schema like that shown in FIG. 12, in accordance with some example embodiments of the present disclosure. The illustrations in FIG. 12 may, for example, be generated by, with the assistance of, and/or under the control of one or more apparatuses, such as object types registry server 210, as described above. In this regard, generation of the one or more object type schemas may invoke one or more of memory 201, processor 202, input/output circuitry 203, communications circuitry 204, and/or object types circuitry 205.

In some embodiments, an object query may be received by the asset management system and a directed graph structure may be traversed to return the selected object type schema associated with the object query. By way of example and depending on what specific object type identifier is selected and/or input as the object query, the asset management system may comprise different object type schemas and their associated objects and object type identifiers from different perspectives.

By way of non-limiting example, if a user of the asset management system selects and/or inputs the object type identifier of Personal Computer 1235 of FIG. 12, then the asset management system may return the object type identifiers of Laptop Computer 1255 and Desktop Computer 1245 and the associated Object A 1290 and Object B 1280 as Personal Computers within the selected object type schema. By way of non-limiting example, the object type schema of FIG. 12 may comprise a mapping between a plurality of object type identifier nodes to show a relationship of object type identifiers (e.g., a relationship is shown between object type identifier node Personal Computer 1235 and object type identifier node Desktop Computer 1245), where an arrow leading away from the object type identifier node to a different object type identifier node may indicate that the object type identifier node indicated by the arrow will be part of the selected object type schema).

By way of non-limiting example, if the object type identifier of the object query is the object type identifier Desktop Computer of the object type identifier node Desktop Computer, the relationship between the Desktop Computer 1245 and the Personal Computer 1235 is determined by the arrow leading away from the Desktop Computer 1245, toward the Personal Computer 1245. Indeed, and by way of non-limiting example, if the object query comprises a selection of object type identifier Desktop Computer associated with object type identifier node Desktop Computer 1245, then the selected object type schema returned by the asset management system may comprise the object type identifiers associated with the Desktop Computer 1245, the Personal Computer 1235, and the Laptop Computer 1255; and the objects may be returned as part of the selected object type schema, such as Object A 1290 and Object B 1280, as Desktop Computers.

FIG. 13 depicts an illustration which broadly illustrates an example selected object type schema comprising a plurality of objects and associated object type identifier nodes in a graph diagram, which may be used for generating a selected object type interface component for an object types registry interface, in accordance with some example embodiments of the present disclosure. The illustrations in FIG. 13 may, for example, be generated by, with the assistance of, and/or under the control of one or more apparatuses, such as object types registry server 210, as described above. In this regard, generation of the one or more object type schemas may invoke one or more of memory 201, processor 202, input/output circuitry 203, communications circuitry 204, and/or object types circuitry 205.

In some embodiments, a GUI of the asset management system (e.g., object types registry interface) may be configured by a selected object type interface component based on the selected object type schema, such as the selected object type schema shown as object type schema 1300. In some embodiments, the selected object type schema may comprise the object type identifier nodes such that only the object type identifiers associated with the object type identifier nodes of the selected object type schema are used to configure the object types registry interface of the asset management system. By way of non-limiting example, a selected object type schema such as that shown as object type schema 1300 may comprise object type identifier nodes, such as Incident Enabled 1310, Change Enabled 1320, Security Score 1330, Service 1340, IT Internal Service 1350, and/or App Service 1340.

In some embodiments, the selected object type schema used to configure the object types registry interface of the asset management system may further comprise Objects (e.g., object identifiers), such as the object identifiers associated with Object A 1390 and/or Object B 1380.

In some embodiments, the selected object type schema used to configure the GUI of the asset management system may further comprise the object attribute identifiers associated with the object attribute identifier nodes mapped to each of the object type identifier nodes of the selected object type schema. For instance, the object attribute identifiers associated with the object type identifier nodes of object type schema 1300 may also be used to configure the GUI of the asset management system and to indicate a plurality of object attribute identifiers (e.g., like the object attribute identifiers of 912, 914, 922, 932, 934, 942, 944, 946, 948, 962, 964 of FIG. 9, and/or the like) to a user of the asset management system.

With reference to FIG. 14, an illustration is provided broadly illustrating an example selected object type interface component rendered on an example object types registry interface which may be generated in associated with an asset management system, in accordance with some example embodiments of the present disclosure. The illustrations in FIG. 14 may, for example, be generated by, with the assistance of, and/or under the control of one or more apparatuses, such as object types registry server 210, as described above. In this regard, generation of the object types registry interface configured with the selected object type schema interface component may invoke one or more of memory 201, processor 202, input/output circuitry 203, communications circuitry 204, and/or object types circuitry 205.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus configured to manage an object types registry interface of an asset management system, the apparatus comprising at least one processor and at least one memory, the at least one memory having computer-coded instructions therein, wherein the computer-coded instructions are configured to, in execution with the at least one processor, cause the apparatus to:

access an asset management repository comprising a plurality of object type identifier nodes and a plurality of object attribute identifier nodes configured in a directed graph structure;

receive an object query comprising a selected object type identifier;

traverse the directed graph structure to return a selected object type schema comprising an object attribute identifier node subset associated with the selected object type identifier; and output a selected object type interface component based on the selected object type schema for rendering to an object types registry interface.

2. The apparatus of claim 1, the computer-coded instructions are further configured to cause the apparatus to:

receive a second attribute creation request, the second attribute creation request comprising a second plurality of object attribute identifier nodes in association with the plurality of object type identifier nodes to be configured in the directed graph structure.

3. The apparatus of claim 2, wherein the second plurality of object attribute identifier nodes comprises at least a second object attribute identifier node configured to generate a second object type schema with an object type identifier node of the plurality of object type identifier nodes.

4. The apparatus of claim 3, the computer-coded instructions are further configured to cause the apparatus to:

generate an association between an object type schema and the second object type schema, wherein the object type schema is associated with the selected object type schema.

5. The apparatus of claim 4, wherein the association between the object type schema and the second object type schema comprises an updated object version identifier associated with the object type identifier node of the second object type schema.

6. The apparatus of claim 1, wherein the plurality of object attribute identifier nodes configured in a directed graph structure comprise a plurality of object version identifiers nodes associated with a plurality of version types for an object type of the object type identifier node.

7. The apparatus of claim 6, the computer-coded instructions are further configured to cause the apparatus to:

generate an object version type schema comprising at least the object type identifier node and the plurality of object version identifier nodes based on a plurality of shared object attribute identifier nodes, wherein each object version identifier node of the plurality of object version identifier nodes comprises at least one of a plurality of incident identifiers or a plurality of change identifiers.

8. The apparatus of claim 7, the computer-coded instructions are further configured to cause the apparatus to:

receive an object version query comprising the selected object type identifier;

traverse the directed graph structure to return the object version type schema comprising at least an object version identifier node subset associated with the selected object type identifier; and output a selected object version type interface component based on the object version identifier node subset for rendering to the object types registry interface.

9. A computer-implemented method for managing an object types registry interface of an asset management system, the computer-implemented method comprising:

accessing an asset management repository comprising a plurality of object type identifier nodes and a plurality of object attribute identifier nodes configured in a directed graph structure;

receiving an object query comprising a selected object type identifier;

traversing the directed graph structure to return a selected object type schema comprising an object attribute identifier node subset associated with the selected object type identifier; and outputting a selected object type interface component based on the selected object type schema for rendering to an object types registry interface.

10. The computer-implemented method of claim 9, further comprising receiving a second attribute creation request, the second attribute creation request comprising a second plurality of attribute identifier nodes in association with the plurality of object type identifier nodes to be configured in the directed graph structure.

11. The computer-implemented method of claim 10, wherein the second plurality of attribute identifier nodes comprises at least a second attribute identifier node configured to generate a second object type schema with an object type identifier node of the plurality of object type identifier nodes.

12. The computer-implemented method of claim 11, further comprising generating an association between an object type schema and the second object type schema, wherein the object type schema is associated with the selected object type schema.

13. The computer-implemented method of claim 12, wherein the association between the object type schema and the second object type schema comprises an updated object version identifier associated with the object type identifier node of the second object type schema.

14. The computer-implemented method of claim 9, wherein the plurality of object attribute identifier nodes configured in a directed graph structure comprise a plurality of object version identifiers nodes associated with a plurality of version types for an object type of the object type identifier node.

15. The computer-implemented method of claim 14, further comprising generating an object version type schema comprising at least the object type identifier node and the plurality of object version identifier nodes based on a plurality of shared object attribute identifier nodes, wherein each object version identifier node of the plurality of object version identifier nodes comprises at least one of a plurality of incident identifiers or a plurality of change identifiers.

16. The computer-implemented method of claim 15, further comprising:

receiving an object version query comprising the selected object type identifier;

traversing the directed graph structure to return the object version type schema comprising at least an object version identifier node subset associated with the selected object type identifier; and outputting a selected object version type interface component based on the object version identifier node subset for rendering to the object types registry interface.

17. A computer-program product comprising at least one non-transitory computer-readable storage medium having computer-readable program code thereon that, in execution with at least one process, configures the computer-program product for:

accessing an asset management repository comprising a plurality of object type identifier nodes and a plurality of object attribute identifier nodes configured in a directed graph structure;

receiving an object query comprising a selected object type identifier;

traversing the directed graph structure to return a selected object type schema comprising an object attribute identifier node subset associated with the selected object type identifier; and outputting a selected object type interface component based on the selected object type schema for rendering to an object types registry interface.

18. The computer-program product of claim 17, wherein the computer-readable program code is further configured for:

receiving a second attribute creation request, the second attribute creation request comprising a second plurality of attribute identifier nodes in association with the plurality of object type identifier nodes to be configured in the directed graph structure.

19. The computer-program product of claim 18, wherein the second plurality of attribute identifier nodes comprises at least a second attribute identifier node configured to generate a second object type schema with an object type identifier node of the object type identifier nodes.

20. The computer-program product of claim 19, wherein the computer-readable program code is further configured for:

generating an association between an object type schema and the second object type schema, wherein the object type schema is associated with the selected object type schema.

21. The computer-program product of claim 20, wherein the association between the object type schema and the second object type schema comprises an updated object version identifier associated with the object type identifier node of the second object type schema.

22. The computer-program product of claim 17, wherein the plurality of object attribute identifier nodes configured in a directed graph structure comprise a plurality of object version identifiers nodes associated with a plurality of version types for an object type of the object type identifier node.

23. The computer-program product of claim 22, wherein the computer-readable program code is further configured for:

generating an object version type schema comprising at least the object type identifier node and the plurality of object version identifier nodes based on a plurality of shared object attribute identifier nodes, wherein each object version identifier node of the plurality of object version identifier nodes comprises at least one of a plurality of incident identifiers or a plurality of change identifiers.

24. The computer-program product of claim 23, wherein the computer-readable program code is further configured for:

receiving an object version query comprising the selected object type identifier;

traversing the directed graph structure to return the object version type schema comprising at least an object version identifier node subset associated with the selected object type identifier; and outputting a selected object version type interface component based on the object version identifier node subset for rendering to the object types registry interface.

* * * * *